(12) United States Patent
Hagerty et al.

(10) Patent No.: US 7,700,699 B2
(45) Date of Patent: *Apr. 20, 2010

(54) POLYMERIZATION PROCESS

(75) Inventors: Robert O. Hagerty, La Porte, TX (US);
Randall B. Laird, Pasadena, TX (US);
Michael A. Risch, Seabrook, TX (US);
Pradeep P. Shirodkar, Stow, OH (US);
Peijun Jiang, League City, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 626 days.

This patent is subject to a terminal disclaimer.

(21) Appl. No.: 11/629,287

(22) PCT Filed: Jun. 20, 2005

(86) PCT No.: PCT/US2005/021720

§ 371 (c)(1),
(2), (4) Date: Dec. 12, 2006

(87) PCT Pub. No.: WO2006/009979

PCT Pub. Date: Jan. 26, 2006

(65) Prior Publication Data

US 2008/0312375 A1  Dec. 18, 2008

Related U.S. Application Data

(60) Provisional application No. 60/581,541, filed on Jun. 21, 2004.

(51) Int. Cl.
*C08F 2/14* (2006.01)
*C08F 4/6592* (2006.01)

(52) U.S. Cl. .......... 526/206; 526/74; 526/160; 526/165; 526/912; 526/943

(58) Field of Classification Search .......... 526/160, 526/165, 348, 943, 74, 206, 912
See application file for complete search history.

(56) References Cited

U.S. PATENT DOCUMENTS

| | | |
|---|---|---|
| 2,952,669 A | 9/1960 | Bro |
| 3,056,771 A | 10/1962 | Aldridge et al. |
| 3,470,143 A | 9/1969 | Schrage et al. |
| 4,950,724 A | 8/1990 | Malanga et al. |
| 5,286,822 A | 2/1994 | Krespan et al. |
| 5,624,878 A | 4/1997 | Devore et al. |
| 5,780,565 A | 7/1998 | Clough et al. |
| 6,534,613 B2 | 3/2003 | Ford et al. |
| 7,423,103 B2 * | 9/2008 | Stavens et al. ............... 526/206 |

FOREIGN PATENT DOCUMENTS

| | | |
|---|---|---|
| EP | 0 369 727 | 2/1994 |
| EP | 0 459 320 | 8/1995 |
| EP | 1 323 746 | 7/2003 |
| JP | 61-007307 | 1/1986 |
| JP | 61007301 | 1/1986 |
| WO | WO92/12182 | 7/1992 |
| WO | WO96/33227 | 10/1996 |
| WO | WO2005/113610 | 12/2005 |
| WO | WO2005/113615 | 12/2005 |
| WO | WO2006/002132 | 1/2006 |
| WO | WO2006/009942 | 1/2006 |
| WO | WO2006/009944 | 1/2006 |
| WO | WO2006/009945 | 1/2006 |
| WO | WO2006/009946 | 1/2006 |
| WO | WO2006/009949 | 1/2006 |
| WO | WO2006/009951 | 1/2006 |
| WO | WO2006/009976 | 1/2006 |
| WO | WO2006/009977 | 1/2006 |
| WO | WO2006/009979 | 1/2006 |
| WO | WO2006/009980 | 1/2006 |
| WO | WO2006/009981 | 1/2006 |
| WO | WO2006/019494 | 2/2006 |
| WO | WO2006/025917 | 3/2006 |
| WO | WO2006/028549 | 3/2006 |
| WO | WO2006/083303 | 8/2006 |

* cited by examiner

*Primary Examiner*—Caixia Lu
(74) *Attorney, Agent, or Firm*—Catherine L. Bell

(57) ABSTRACT

This invention is directed to processes of making polymer in the presence of a fluorinated hydrocarbon and recovering the polymer. The processes provided enable polymerization processes to be practiced with minimal fouling in the reaction system, and allows for the recovery of the fluorinated hydrocarbon and other hydrocarbons such as hydrocarbons for re-use in the process or hydrocarbon by-products from the polymerization process. The invention is particularly beneficial in the production of propylene polymers and copolymes using bulky ligand metallocene-type catalyst systems.

63 Claims, No Drawings

POLYMERIZATION PROCESS

CROSS REFERENCE TO RELATED APPLICATIONS

This application claims the benefit of Provisional Application No. 60/581,541 filed Jun. 21, 2004, the disclosure of which is fully incorporated herein by reference.

PRIORITY CLAIM

This application is the national phase entry into the United States Patent Office of international application number PCT/US2005/021720 filed Jun. 20, 2005, which claims benefit of and priority to U.S. Provisional Patent Application Ser. No. 60/581,541 filed Jun. 21, 2004.

FIELD OF THE INVENTION

This invention is directed to a process for producing propylene polymer using a diluent containing at least one fluorinated hydrocarbon. In particular, this invention is directed to a process for producing a propylene polymer and/or copolymer in the presence of a diluent containing at least one fluorinated hydrocarbon and using a bulky ligand metallocene-type catalyst system.

BACKGROUND OF THE INVENTION

Polypropylene homopolymer has many useful applications. However, polypropylene homopolymer alone is often unsuitable for applications that require low melting point and higher flexibility as well as enhanced clarity. Polypropylene random copolymers (RCP) are specially suited for such applications.

Conventional RCPs are typically made through random incorporation of ethylene or other comonomer into polypropylene. The presence of comonomer disrupts polymer stereoregularity and lowers its crystallinity, resulting in lower melting point, lower modulus and higher clarity.

A large number of processes for preparing propylene homo- and copolymers are known in the art. Many different kinds of slurry and gas phase processes can be employed when a supported catalyst is used for polymerization.

One type of propylene polymerization process is a bulk or a slurry process, wherein the reaction takes place in pure monomer or in a reaction medium containing more than 60 weight % of the monomer. The bulk process is carried out in continuously stirred tank reactors (CSTR) or loop reactors. In a loop reactor, the first reaction stage consists of one or two tubular loop reactors where bulk polymerization of homopolymers is carried out in liquid propylene. Prepolymerized catalyst, liquid propylene, hydrogen for controlling molecular weight are continuously fed into the reactor in which polymerization takes place at temperatures of 60-80° C. and pressures of 35-40 bar. The polymer in the liquid propylene inside the loops is continuously discharged to a separation unit, and unreacted propylene is recycled to the reaction medium. Granular product is discharged to a flashing unit for product/monomer separation.

One difficulty associated with slurry processes is granular or fine particle generation. This is especially true for the production of high melt flow rate (MFR) polypropylene.

Random copolymers produced during bulk/slurry polymerizations using hydrocarbon solvents, in particular polymers of high ethylene content and/or low molecular weight, are sticky in the reaction medium. This can cause considerable problems in such bulk/slurry polymerization applications. This problem can be mitigated by operating the polymerization reactor under super critical conditions as disclosed in WO 92/12182, since by nature a super critical fluid has lower solvency to polymer, and nearly unlimited solubility of gaseous components. Simultaneously, the separation of the recycled reaction medium and recovered polymer is simplified under supercritical conditions, because of the energy available in the polymerization product. However, supercritical operation requires handling of high-pressure equipment and is energy intensive and expensive.

Production of high ethylene content and/or low molecular weight polymers also causes difficulty in the operation of conventional flash systems. Such flash systems are highly sensitive to highly soluble polymer fractions. Any non-evaporated liquid in the separation tank risks blocking the device. This is particularly true for cyclone type of devices operated at high pressures.

Processes originally used in the manufacture of polypropylene were based on the use of a hydrocarbon diluent to suspend crystalline polymer particles formed in the process and dissolve the amorphous polymer fraction. Residual catalyst components were deactivated and solubilized by treatment with alcohol, and the deactivated catalyst separated from the diluent by treatment with water. The crystalline polymer product was separated from the diluent by filtration or centrifugation and then dried. The amorphous polymer, which was soluble in the diluent, was separated by evaporation.

What has been referred to as fourth generation polymerization catalysts in *Polypropylene Handbook*, Edward P. Moore, Jr., Ed., Hanser Publishers, 1996, have led to processes that do not require the use of diluents in the polymerization process by using either liquid or gaseous monomer as the polymerization medium. The stickiness of polymer can be mitigated through reducing the granule swell and improved particle morphology. An example of a polymerization process that incorporates the use of a diluent is shown in U.S. Pat. No. 3,470,143 (Schrage et al.). Specifically, the Schrage patent discloses the use of a fluorinated organic carbon compound as a diluent in polymerizing at least one ethylenically unsaturated hydrocarbon monomer to form an amorphous elastomer. The product can be dried in the form of small particles.

EP 1 323 746 shows loading of biscyclopentadienyl catalyst onto a silica support in perfluorooctane and thereafter the prepolymerization of ethylene at room temperature.

U.S. Pat. No. 5,624,878 discloses the polymerization using "constrained geometry metal complexes" of titanium and zirconium.

There remains a need to increase polymer product quality and process efficiency, particularly processes that reduce slurry polymerization fouling without suffering any substantial loss in polymerization activity. It is particularly desirable to find polymerization processes that use propylene as at least one monomer feed component, and to produce a polypropylene polymer or copolymer type product that can be recovered in particle form. Such a process would also be desirable in the production of propylene polymers with little to no copolymer or propylene-ethylene type polymers that have any of a wide range of ethylene molecules incorporated into the copolymer. Processes that provide for higher flexibility in types of catalyst that can be used, as well as provide copolymers that are very low in crystallinity are especially preferred.

SUMMARY OF THE INVENTION

This invention provides a process for making a polymer product at relatively high catalytic productivity and with very low reactor fouling during the reaction process. The invention incorporates the use of a fluorinated hydrocarbon compound, and provides a wide variety of propylene polymer and copolymer products.

According to one aspect of the invention, there is provided a process for producing polymer. The process comprises mixing together a diluent containing at least one fluorinated hydrocarbon, a bulky ligand metallocene-type catalyst system, and an olefin feed containing propylene and optionally one or more comonomers; and forming the polymer.

The process can be used in any type of polymerization process employing propylene to make propylene homopolymers and optionally one or more comonomers to make propylene copolymers. Slurry processes are preferred, and the use of one or more of the optional comonomers can act to provide a copolymer that has lower melting temperature and crystallinity compared to the propylene homopolymer. Typical comonomers that can be included with propylene in the olefin feed to the polymerization process of the invention include one or more unsaturated hydrocarbons having 2 or from 4 to 30 carbon atoms, preferably 2 or from 4 to 12 carbon atoms, and more preferably 2 or from 4 to 8 carbon atoms.

In one embodiment, the olefin feed contains propylene and ethylene in an amount not greater than 10 weight % ethylene, based on total weight of the olefin feed. In another embodiment, the olefin feed contains at least 25 weight % propylene and greater than 10 weight % ethylene, based on total weight of the feed.

In one embodiment, the fluorinated hydrocarbons that are used in the process of this invention are represented by the formula:

$$C_xH_yF_z$$

wherein x is an integer from 1 to 40, wherein y is greater than or equal to 0 and z is an integer and at least one. More preferably, y and z are integers and at least one.

In another embodiment, the fluorinated hydrocarbon is present in the diluent at greater than 5 weight %, based on the total weight of the diluent. In another embodiment, the fluorinated hydrocarbon is present in the diluent at not greater than 90 weight %, based on the total weight of the diluent.

The process of the invention can be carried out in a loop reactor or a stirred tank reactor. In one embodiment, a slurry is continuously discharged from the reactor as polymerization effluent. Typically, the polymerization effluent is flashed in a first flash to vaporize from about 50% to about 100% of liquid in the effluent to produce concentrated polymer effluent and vaporized liquid.

In any of the embodiments described herein the materials stripped or flashed off may be passed through activated carbon to remove all or part of the fluorinated hydrocarbon.

Other embodiments of the invention are defined by any two or more of the above limitations in combination.

DETAILED DESCRIPTION OF THE INVENTION

I. Introduction

This invention is directed to a process for producing polymer, preferably propylene polymer, that is carried out at relatively high productivity levels and with relatively low fouling. According to this invention a propylene homopolymer is a polymer that is manufactured using only propylene as the monomer in the feed. A copolymer is considered a polymer that is manufactured from at least two monomers, with at least one of the monomers being propylene in this invention. The amount of propylene contained in the copolymer can vary according to the type of polymer desired. In general, as used in describing this invention, the term polymer can refer to either homopolymer or copolymer.

According to one aspect of the invention, propylene polymers are manufactured using ethylene as a comonomer. Such polymers have the flexibility of incorporating a wide range of ethylene. The propylene-ethylene type copolymer manufactured according to this invention are typically low in crystallinity, and can be recovered in particle form, since the process incorporates the use of a preferred fluorinated hydrocarbon diluent. The particle forming process can be further enhanced by producing the polymer at low temperature or using an additional prepolymerization step. The fluorinated hydrocarbon diluent used in the process of the invention provides the added advantage that there is no significant loss in polymerization activity, particularly in a slurry form process.

The process of the invention includes mixing together a diluent, a catalyst system and olefin feed to make the desired polymer. Preferably the diluent contains at least one fluorinated hydrocarbon. The catalyst is preferably a bulky ligand metallocene-type catalyst system, and the olefin feed optionally contains a comonomer. The mixture of diluent, catalyst and feed is conducted to form a slurry, with polymer being formed in the slurry. The polymer is then recovered from the slurry, while any unreacted or unused materials from the process can be recovered and re-used or discarded as desired.

II. Diluent

The diluent used in this invention is beneficial in producing highly useful polymer products. Use of the diluent can also provide polymer processes having reduced fouling, higher overall efficiencies and/or reduced environmental emissions. The diluent of the invention is preferably one or more compositions added to the reaction process that reduces the concentration of one or more active materials in the process to achieve the desired and beneficial effect. Preferably, the diluent composition is a hydrocarbon having little to no solvent power with respect to polymer produced. More preferably, the diluent contains a halogen containing, most preferably fluorinated hydrocarbon compound, and the diluent preferably has little to no solvent power with respect to the polymer product. The fluorinated hydrocarbon components can be used individually or as mixtures, and can be included in a mixture with non-fluorinated hydrocarbon compounds if desired.

According to this invention, the term fluorinated hydrocarbon is interchangeably referred to as hydrofluorocarbon or hydrofluorocarbon compound or HFC. The fluorinated hydrocarbon compounds have at least one carbon atom and at least one fluorine atom. The fluorinated hydrocarbon can be a perfluorinated hydrocarbon or the fluorinated hydrocarbon can optionally include one or more hydrogen atom(s). A perfluorinated hydrocarbon is a fluorocarbon in which the hydrogen directly attached to the carbon atom(s) is completely replaced by fluorine. See *Hawley's Condensed Chemical Dictionary*, Thirteenth Edition, Van Nostrand Renhold, 1997. Examples of preferred perfluorocarbons include linear branched or cyclic, $C_1$ to $C_{40}$ perfluoroalkanes.

In one embodiment, the fluorinated hydrocarbons are represented by the formula:

wherein x is an integer from 1 to 40, alternatively from 1 to 30, alternatively from 1 to 20, alternatively from 1 to 10, alternatively from 1 to 6, alternatively from 2 to 20, alternatively from 3 to 10, alternatively from 3 to 6, most preferably from 1 to 3, wherein y is greater than or equal to 0 and z is an integer and at least one, more preferably, y and z are integers and at least one. In a preferred embodiment, z is 2 or more.

In one embodiment, a mixture of fluorinated hydrocarbons is used in the process of the invention, preferably a mixture of a perfluorinated hydrocarbon and a fluorinated hydrocarbon, and more preferably a mixture of a fluorinated hydrocarbon. In yet another embodiment, the fluorinated hydrocarbon is balanced or unbalanced in the number of fluorine atoms in the fluorinated hydrocarbon compound.

Non-limiting examples of fluorinated hydrocarbons include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane. In addition to those fluorinated hydrocarbons described herein, those fluorinated hydrocarbons described in Raymond Will, et. al., CEH Marketing Report, *Fluorocarbons*, Pages 1-133, by the Chemical Economics Handbook-SRI International, April 2001, which is fully incorporated herein by reference, are included.

In another embodiment, the fluorocarbon is not a perfluorinated $C_4$ to $C_{10}$ alkane. In another embodiment, the fluorocarbon is not perfluorodecalin, perfluoroheptane, perfluorohexane, perfluoromethylcyclohexane, perfluorooctane, perfluoro-1,3-dimethylcyclohexane, perfluorononane, or perfluorotoluene.

In another embodiment the fluorinated hydrocarbons are used in combination with one or more inert gases such as nitrogen, hydrogen, argon, neon, helium, krypton, zenon, and the like. In the preferred embodiment, the inert gas is nitrogen.

In one embodiment, commercially available fluorinated hydrocarbons useful in the process of the invention include HFC-236fa having the chemical name 1,1,1,3,3,3-hexafluoropropane, HFC-134a having the chemical name 1,1,1,2-tetrafluoroethane, HFC-245fa having the chemical name 1,1,1,3,3-pentafluoropropane, HFC-365mfc having the chemical name 1,1,1,3,3-pentafluorobutane, R-318 having the chemical name octafluorocyclobutane, and HFC-43-10mee having the chemical name 2,3-dihydrodecafluoropentane.

In another embodiment, the fluorocarbon is not a perfluorinated C4 to C10 alkane. In another embodiment, the fluorocarbon is not a perfluorinated hydrocarbon. In another embodiment, the fluorocarbon is not perfluorodecalin, perfluoroheptane, perfluorohexane, perfluoromethylcyclohexane, perfluorooctane, perfluoro-1,3-dimethylcyclohexane, perfluorononane, fluorobenzene, or perfluorotoluene. In a particularly preferred embodiment, the fluorocarbon consists essentially of hydrofluorocarbons.

In another embodiment the fluorocarbon is present at more than 1 weight %, based upon the weight of the fluorocarbon and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In another embodiment the fluorocarbon is present at more than 1 weight %, based upon the weight of the fluorocarbons, monomers and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In the event that the weight basis is not named for the weight % fluorocarbon, it shall be presumed to be based upon the total weight of the fluorocarbons, monomers and hydrocarbon solvents present in the reactor.

In another embodiment the fluorocarbon, preferably the hydrofluorocarbon, is present at more than 1 volume %, based upon the total volume of the fluorocarbon, monomers and any hydrocarbon solvent present in the reactor, preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In another embodiment the fluorocarbon is a blend of hydrofluorocarbon and perfluorocarbon, and preferably the hydrofluorocarbon is present at more than 1 volume %, based upon the total volume of the hydrofluorocarbon and perfluorocarbon present in the reactor (with the balance being made up by the perfluorocarbon), preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In yet another embodiment, the fluorinated hydrocarbons of the invention have a molecular weight (MW) greater than 30 a.m.u., preferably greater than 35 a.m.u, and more preferably greater than 40 a.m.u. In another embodiment, the fluorinated hydrocarbons of the invention have a MW greater than 60 a.m.u, preferably greater than 65 a.m.u, even more preferably greater than 70 a.m.u, and most preferably greater than 80 a.m.u. In still another embodiment, the fluorinated hydrocarbons of the invention have a MW greater than 90 a.m.u, preferably greater than 100 a.m.u, even more preferably greater than 135 a.m.u, and most preferably greater than 150 a.m.u. In another embodiment, the fluorinated hydrocarbons of the invention have a MW greater than 140 a.m.u, preferably greater than 150 a.m.u, more preferably greater than 180 a.m.u, even more preferably greater than 200 a.m.u, and most preferably greater than 225 a.m.u. In an embodiment, the fluorinated hydrocarbons of the invention have a MW in the range of from 30 a.m.u to 1000 a.m.u, preferably in the range of from 100 a.m.u to 500 a.m.u, more preferably in the range of from 100 a.m.u to 300 a.m.u, and most preferably in the range of from about 100 a.m.u to about 250 a.m.u.

In yet another embodiment, the fluorinated hydrocarbons of the invention have normal boiling points in the range of from about −100° C. to 100° C. Preferably the normal boiling point of the fluorinated hydrocarbons is in the range of from −40° C. to about 70° C., more preferably from about −60° C. to about 85° C., and most preferably from about −30° C. to about 80° C. In an embodiment, the fluorinated hydrocarbons of the invention have normal boiling points greater than −30° C., preferably greater than −30° C. to less than −10° C. In a further embodiment, the fluorinated hydrocarbons of the invention have normal boiling points greater than −5° C., preferably greater than −5° C. to less than −20° C. In one embodiment, the fluorinated hydrocarbons of the invention have normal boiling points greater than 30° C., preferably greater than 30° C. to about 60° C.

In another embodiment, the fluorinated hydrocarbons of the invention have a liquid density @ 20° C. (g/cc) 2.0 g/c or less, preferably 1.8 cc/g or less, and most preferably 1.6 g/cc or less. In one embodiment, the fluorinated hydrocarbons of the invention have a liquid density @ 20° C. (g/cc) greater than 0.7 g/cc, preferably greater than 1.0 and most preferably greater than 1.2 g/cc. In one embodiment, the fluorinated hydrocarbons of the invention have a liquid density @ 20° C. (g/cc) greater than 1.3 g/cc, preferably greater than 1.4, and most preferably greater than 1.5 g/cc.

According to another embodiment of the invention, the diluent comprises a mixture of at least one non-fluourinated hydrocarbon and at least one fluorinated hydrocarbon, wherein the mixture has a density @ 20° C. (g/cc) in the range of from 0.2 g/cc less than to 0.2 g/cc greater than the density of the polymer, alternatively from 0.1 g/cc less than to 0.1 g/cc greater than the density of the polymer, alternatively from 0.05 g/cc less than to 0.05 g/cc greater than the density of the polymer.

In one embodiment, the fluorinated hydrocarbons of the invention have a ΔH Vaporization at the normal boiling point as measured by standard calorimetry techniques in the range between 100 kJ/kg to less than 500 kJ/kg, preferably in the range of from 110 kJ/kg to less than 450 kJ/kg, and most preferably in the range of from 120 kJ/kg to less than 400 kJ/kg.

In another embodiment, the diluent used in the invention comprises any combination of two or more fluorinated hydrocarbons having the aforementioned MW, normal boiling point, ΔH Vaporization, and liquid density values and ranges. In a preferred embodiment, the fluorinated hydrocarbons useful in the process of the invention have a MW greater than 30 a.m.u, preferably greater than 40 a.m.u, and a liquid density less than 2.0 g/cc, preferably less than 1.8 g/cc. In yet another preferred embodiment, the fluorinated hydrocarbons useful in the process of the invention have a liquid density less than 1.9 g/cc, preferably less than 1.8 g/cc, and a normal boiling point greater than −100° C., preferably greater than −50° C. up to the polymerization temperature of the process, which is preferably as high as 115° C., more preferably less than 100° C., still more preferably less than 90° C., and most preferably less than 80° C. In one embodiment, the fluorinated hydrocarbons useful in the process of the invention have a MW greater than 30 a.m.u, preferably greater than 40 a.m.u, and a ΔH Vaporization in the range of from 100 kJ/kg to 500 kJ/kg, and optionally a liquid density less than 2.0 g/cc, preferably less than 1.8 g/cc. In yet another embodiment, the fluorinated hydrocarbons useful in the process of the invention have a liquid density less than 1.9 g/cc, preferably less than 1.8 g/cc, and a normal boiling point greater than −100° C., preferably greater than −50° C. up to the polymerization temperature of the process, which is preferably as high as 115° C., more preferably less than 100° C., still more preferably less than 90° C., and most preferably less than 60° C., and optionally a ΔH Vaporization in the range of from 120 kJ/kg to 400 kJ/kg.

In yet another embodiment, the diluent includes one or more fluorinated hydrocarbon(s) alone or in combination with one or more non-fluorinated hydrocarbons. Examples of suitable, preferably inert, liquid hydrocarbons, for example, saturated hydrocarbons containing from 1 to 10, preferably 3 to 8, carbon atoms. Preferred examples include propane, n-butane, isobutane (MW of 58.12 a.m.u, a liquid density of 0.55 g/cc, and normal boiling point as above described of −11.75), n-pentane, isopentane (MW of 72.15 a.m.u, a liquid density of 0.62 g/cc, and normal boiling point of 27.85), neopentane, n-hexane, isohexane, and other saturated $C_6$ to $C_8$ hydrocarbons. In one embodiment, the diluent further comprises at least one $C_1$ to $C_{40}$ alkane.

In another embodiment, the fluorinated hydrocarbon is present in the diluent at greater than 5 weight %, based on the total weight of the diluent. Preferably the fluorinated hydrocarbon is present in the diluent at greater than 7 weight %, more preferably greater than 10 weight %, and most preferably greater than 15 weight %, based on the total weight of the diluent. In another embodiment, the fluorinated hydrocarbon is present in the diluent at not greater than 90 weight %, based on the total weight of the diluent. In another embodiment, the fluorinated hydrocarbon is present in the diluent at not greater than 80 weight %, or not greater than 70 weight %, or not greater than 60 weight %, or not greater than 50 weight %, based on the total weight of the diluent.

In another embodiment, the diluent material, which contains the fluorinated hydrocarbon as well as the other optional condensable fluid, is selected based upon its solubility or lack thereof in a particular polymer being produced. Preferred diluents have little to no solubility in the polymer. Solubility in the polymer is measured by forming the polymer into a film of thickness between 50 and 100 microns, then soaking it in diluent (enough to cover the film) for 4 hours at the relevant desired temperature in a sealed container or vessel. The film is removed from the diluent, exposed for 90 seconds to evaporate excess fluid from the surface of the film, and weighed. The mass uptake is defined as the percentage increase in the film weight after soaking. The diluent is preferably selected so that the polymer has a mass uptake of less than 4 weight %, preferably less than 3 weight %, more preferably less than 2 weight %, even more preferably less than 1 weight %, and most preferably less than 0.5 weight %.

Ideally, the fluorocarbon is inert to the polymerization reaction. By "inert to the polymerization reaction" is meant that the fluorocarbon does not react chemically with the, monomers, catalyst system or the catalyst system components. (This is not to say that the physical environment provided by an fluorocarbons does not influence the polymerization reactions, in fact, it may do so to some extent, such as affecting activity rates. However, it is meant to say that the fluorocarbons are not present as part of the catalyst system.)

In a preferred embodiment, the diluent, preferably, the fluorinated hydrocarbon(s) or mixtures thereof, are selected such that the polymer melting temperature Tm is reduced (or depressed) by not more than 15° C. by the presence of the condensable fluid. The depression of the polymer melting temperature ΔTm is determined by first measuring the melting temperature of a polymer by differential scanning calorimetry (DSC), and then comparing this to a similar measurement on a sample of the same polymer that has been soaked with the condensable fluid. In general, the melting temperature of the soaked polymer will be lower than that of the dry polymer. The difference in these measurements is taken as the melting point depression ΔTm. It is well known to those in the art that higher concentrations of dissolved materials in the polymer cause larger depressions in the polymer melting temperature (i.e., higher values of ΔTm). A suitable DSC technique for determining the melting point depression is described by P. V. Hemmingsen, "Phase Equilibria in Polyethylene Systems", Ph.D Thesis, Norwegian University of Science and Technology, March 2000, which is incorporated herein by reference. (A preferred set of conditions for conducting the tests are summarized on Page 112 of this reference.) The polymer melting temperature is first measured with dry polymer, and then repeated with the polymer immersed in liquid (the condensable fluid to be evaluated). As described in the reference above, it is important to ensure that the second part of the test, conducted in the presence of the liquid, is done in a sealed container so that the liquid is not flashed during the test, which could introduce experimental error. In one embodiment, the ΔTm is less than 12° C., preferably less than 10° C., preferably less than 8° C., more preferably less than 6° C., and most preferably less than 4° C. In another embodiment, the measured ΔTm is less than 5° C., preferably less than 4° C., more preferably less than 3° C., even more preferably less than 2° C., and most preferably less than 1° C.

In a preferred embodiment, the fluorocarbon(s) or mixtures thereof, preferably, the fluorocarbon or mixtures thereof, are selected such that these are miscible to the hydrocarbon diluent and liquid monomers when a mixture is used. By miscible is meant that the fluorocarbon and the hydrocarbon mixture will not have liquid phase separation. Liquid phase separation is determined by mixing a fluorocarbon and a hydrocarbon in a vessel with sight glass at polymerization conditions, then visually observing if phase separation occurs after vigorous mixing for five minutes.

III. Bulky Ligand Metallocene-Type Catalyst System

The polymer is formed in a catalytic process using a bulky ligand metallocene-type catalyst system. The use of the bulky ligand metallocene-type catalyst system provides the capability of producing a polymer product with little to no reactor fouling, and producing a polymer product that is very low in density.

The catalyst system of the invention will typically include a bulky ligand metallocene-type (i.e., metallocene) catalyst compound, and an activator compound, and may also include support materials and one or more co-catalysts. The components of the catalyst system are chosen to be capable of being utilized in the polymerization process selected. For example, polymerization may be conducted in a slurry and/or in a solution where the slurry and solution are used separately or combined and introduced into a polymerization reactor. The catalysts, co-catalysts and activator compounds can include the support materials. As used herein, the notation numbering scheme for the Periodic Table Groups are used as set out in *Chemical And Engineering News*, 63(5), 27, (1985).

A. Bulky Ligand Metallocenes

The catalyst compositions of the invention may include one or more bulky ligand metallocene-type compounds (also referred to herein as metallocenes). Typical bulky ligand metallocene-type compounds are generally described as containing one or more bulky ligand(s) and one or more leaving group(s) bonded to at least one metal atom. The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements; preferably the atoms are selected from the group consisting of carbon, nitrogen, oxygen, silicon, sulfur, phosphorous, germanium, boron and aluminum or a combination thereof. Most preferably, the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the catalyst composition of the invention includes one or more bulky ligand metallocene-type catalyst compounds represented by the formula:

$$L^A L^B MQ_n \quad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example, tetrahydroindenyl ligands. In one embodiment, $L^A$ and $L^B$ may be any other ligand structure capable of π-bonding to M. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of Formula I only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or a combination thereof. In a preferred embodiment, substituent groups R have up to 50 non-hydrogen atoms, preferably from 1 to 30 carbons, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as, but not limited to, olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that Formula I above represents a neutral bulky ligand metallocene-type catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the catalyst composition of the invention may include one or more bulky ligand metallocene-type catalyst compounds where $L^A$ and $L^B$ of Formula I are bridged to each other by at least one bridging group, A, as represented by Formula II.

$$L^A A L^B MQ_n \quad (II)$$

The compounds of Formula II are known as bridged, bulky ligand metallocene-type catalyst compounds. $L^A$, $L^B$, M, Q and n are as defined above. Non-limiting examples of bridging group A include bridging groups containing at least one Group 13 to 16 atom, often referred to as a divalent moiety such as, but not limited to, at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, R'$_2$Si, R'$_2$Si R'$_2$Si, R'$_2$Ge, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene-type catalyst compounds of Formula II have two or more bridging groups A (EP 664 301 B1).

In another embodiment, the bulky ligand metallocene-type catalyst compounds are those where the R substituents on the bulky ligands $L^A$ and $L^B$ of Formulas I and II are substituted with the same or different number of substituents on each of the bulky ligands. In another embodiment, the bulky ligands $L^A$ and $L^B$ of Formulas I and II are different from each other.

Other bulky ligand metallocene-type catalyst compounds and catalyst systems useful in the invention may include those described in U.S. Pat. Nos. 5,064,802; 5,145,819; 5,149,819; 5,243,001; 5,239,022; 5,276,208; 5,296,434; 5,321,106; 5,329,031; 5,304,614; 5,677,401; 5,723,398; 5,753,578; 5,854,363; 5,856,547; 5,858,903; 5,859,158; 5,900,517; 5,939,503 and PCT publications WO 93/08221; WO 93/08199; WO 95/07140; WO 98/11144; WO 98/41530; WO 98/41529; WO 98/46650; WO 99/02540; WO 99/14221 and European publications EP-A-0 578 838; EP-A-0 638 595; EP-B-0 513 380; EP-A1-0 816 372; EP-A2-0 839 834; EP-B1-0 632 819; EP-B1-0 748 821 and EP-B1-0 757 996, all of which are fully incorporated herein by reference.

In another embodiment, the catalyst compositions of the invention may include bridged heteroatom, mono-bulky ligand metallocene-type compounds. These types of catalysts and catalyst systems are described in, for example, PCT publication WO 92/00333; WO 94/07928; WO 91/04257; WO 94/03506; WO96/00244; WO 97/15602; WO 99/20637 and U.S. Pat. Nos. 5,057,475; 5,096,867; 5,055,438; 5,198,401; 5,227,440; 5,264,405 and European publication EP-A-0 420 436, all of which are fully incorporated herein by reference.

In another embodiment, the catalyst composition of the invention includes one or more bulky ligand metallocene-type catalyst compounds represented by Formula III:

$$L^CAJMQ_n \quad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to J and $L^C$; J is a heteroatom ancillary ligand; and A is a bridging group; Q is a univalent anionic ligand; and n is the integer 0, 1 or 2. In Formula V above, $L^C$, A and J form a fused ring system. In an embodiment, $L^C$ of Formula V is as defined above for $L^A$. A, M and Q of Formula III are as defined above in Formula I.

In Formula III, J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred. Preferably, when the catalyst system comprises compounds represented by Formula III, the fluorocarbon is not a perfluorocarbon.

In an embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene-type catalyst compounds are described in WO 96/33202; WO 96/34021; WO 97/17379; WO 98/22486 and EP-A1-0 874 005 and U.S. Pat. Nos. 5,637,660; 5,539,124; 5,554,775; 5,756,611; 5,233,049; 5,744,417; and 5,856,258, all of which are incorporated herein by reference.

In one embodiment, the bulky ligand metallocene-type catalyst compounds are those complexes known as transition metal catalysts based on bidentate ligands containing pyridine or quinoline moieties, such as those described in U.S. application Ser. No. 09/103,620 filed Jun. 23, 1998, which is incorporated herein by reference. In another embodiment, the bulky ligand metallocene-type catalyst compounds are those described in PCT publications WO 99/01481 and WO 98/42664, which are fully incorporated herein by reference.

In another embodiment, the bulky ligand metallocene-type catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752; 5,747,406 and EP-B1-0 735 057, all of which are fully incorporated herein by reference.

In another embodiment, the catalyst composition of the invention includes one or more bulky ligand metallocene-type catalyst compounds represented by Formula IV:

$$L^DMQ_2(YZ)X_n \quad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2$(YZ) forms a ligand, preferably a uncharged polydentate ligand; or Q is a univalent anionic ligand also bonded to M; X is a univalent anionic group when n is 2 or X is a divalent anionic group when n is 1; n is 1 or 2.

In Formula IV, L and M are as defined above for Formula I. Q is as defined above for Formula I, preferably Q is selected from the group consisting of —O—, —NR—, —CR2- and —S—; Y is either C or S; Z is selected from the group consisting of —OR, —NR2, —CR3, —SR, —SiR3, —PR2, —H, and substituted or unsubstituted aryl groups, with the proviso that when Q is —NR— then Z is selected from one of the groups consisting of —OR, —NR2, —SR, —SiR3, —PR2 and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment, the bulky ligand metallocene-type catalyst compounds are those described in PCT publications WO 99/01481 and WO 98/42664, which are fully incorporated herein by reference.

Useful Group 6 bulky ligand metallocene-type catalyst systems are described in U.S. Pat. No. 5,942,462, which is incorporated herein by reference.

Still other useful catalysts include those multinuclear bulky ligand metallocene-type catalysts as described in WO 99/20665 and U.S. Pat. No. 6,010,794, and transition metal metaaracyle structures described in EP 0 969 101 A2, which are incorporated herein by reference. Other bulky ligand metallocene-type catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394, which are incorporated, herein by reference.

It is also contemplated that in one embodiment the bulky ligand metallocene-type catalysts, described above, include their structural or optical or enantiomeric isomers (meso and racemic isomers, for example, see U.S. Pat. No. 5,852,143, incorporated herein by reference) and mixtures thereof.

B. Supports, Carriers and Techniques

In one embodiment, the catalyst composition of the invention includes a support material or carrier, and preferably includes a supported activator. For example, the catalyst composition component, preferably the activator compound and/or the catalyst compound, is deposited on, contacted with, vaporized with, bonded to, or incorporated within, adsorbed or absorbed in, or on, a support or carrier.

The support material is any of the conventional support materials. Preferably the supported material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred support materials are inorganic oxides that include those Group 2, 3, 4, 5, 13 or 14 metal oxides. The preferred supports include silica, which may or may not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all incorporated herein by reference.

It is preferred that the support material, most preferably an inorganic oxide, has a surface area in the range of from about 10 to about 700 m2/g, pore volume in the range of from about 0.1 to about 4.0 cc/g and average particle size in the range of from about 5 to about 500 µm. More preferably, the surface area of the support material is in the range of from about 50 to about 500 m2/g, pore volume of from about 0.5 to about 3.5 cc/g and average particle size of from about 10 to about 200 µm. Most preferably the surface area of the support material is in the range from about 100 to about 400 m2/g, pore volume from about 0.8 to about 3.0 cc/g and average particle size is from about 5 to about 100 µm. The average pore size of the carrier of the invention typically has pore size in the range of from 10 to 1000 Å, preferably 50 to about 500 Å, and most preferably 75 to about 350 Å.

The support materials may be treated chemically, for example, with a fluoride compound as described in WO 00/12565, which is incorporated herein by reference. Other supported activators are described in, for example, WO 00/13792 that refers to supported boron containing solid acid complex.

In a preferred embodiment, fumed silica available under the trade name Cabosil™ TS-610, available from Cabot Corporation is utilized as a nucleating agent or as a viscosity builder in the catalyst component slurry discussed below. Fumed silica is typically a silica with particles 7 to 30 nanometers in size that has been treated with dimethylsilyldichloride such that a majority of the surface hydroxyl groups are capped. In another embodiment the fumed silica utilized has a particle size of less than 40 microns, preferably less than 20 microns, or preferably less than 10 microns.

In a preferred method of forming a supported catalyst composition component, the amount of liquid in which the activator is present is in an amount that is less than four times the pore volume of the support material, more preferably less than three times, even more preferably less than two times; preferred ranges being from 1.1 times to 3.5 times range and most preferably in the 1.2 to 3 times range. In an alternative embodiment, the amount of liquid in which the activator is present is from one to less than one times the pore volume of the support material utilized in forming the supported activator.

Procedures for measuring the total pore volume of a porous support are well known in the art. Details of one of these procedures is discussed in Volume 1, *Experimental Methods in Catalytic Research* (Academic Press, 1968) (specifically see pages 67-96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332-334 (March, 1956).

C. Activators and Activation Methods

The polymerization catalyst compounds useful in this invention can be activated in various ways to yield compounds having a vacant coordination site that will coordinate, insert, and polymerize olefin(s). For the purposes of this invention, the term "activator" is defined to be any compound which can activate any one of the catalyst compounds described herein by converting the neutral catalyst compound to a catalytically active catalyst cation compound. Non-limiting activators, for example, include alumoxanes, aluminum alkyls, ionizing activators, which may be neutral or ionic, and conventional-type cocatalysts.

1. Alumoxanes

In one embodiment, alumoxane activators are utilized as an activator in the catalyst composition of the invention. Alumoxanes are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; 5,693,838; 5,731,253; 5,731,451; 5,744,656; 5,847,177; 5,854,166; 5,856,256; 5,939,346 and European publications EP-A-0 561 476; EP-B1-0 279 586; EP-A-0 594-218; EP-B1-0 586 665, and PCT publications WO 94/10180 and WO 99/15534, all of which are fully incorporated herein by reference. Another alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

Aluminum Alkyl or organoaluminum compounds which may be utilized as activators include trimethylaluminum, triethylaluminum, triisobutylaluminum, tri-n-hexylaluminum, tri-n-octylaluminum and the like.

2. Ionizing Activators

It is within the scope of this invention to use an ionizing or stoichiometric activator, neutral or ionic, such as tri (n-butyl) ammonium tetrakis (pentafluorophenyl)boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators.

Examples of neutral stoichiometric activators include trisubstituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

"Substituted alkyl" refers to an alkyl as described in which one or more hydrogen atoms of the alkyl is replaced by another group such as a halogen, aryl, substituted aryl, cycloalkyl, substituted cycloalkyl, and combinations thereof. Examples of substituted alkyls include, for example, benzyl, trifluoromethyl and the like.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982; EP-A-0 520 732; EP-A-0 495 375; EP-B1-0 500 944; EP-A-0 277 003; EP-A-0 277 004, and U.S. Pat. Nos. 5,153,157; 5,198,401; 5,066,741; 5,206,197; 5,241,025; 5,384,299; 5,502,124 and U.S. patent application Ser. No. 08/285,380, filed Aug. 3, 1994, all of which are fully incorporated herein by reference.

In a preferred embodiment, the stoichiometric activators include a cation and an anion component, and may be represented by the following formula:

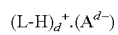

$(L-H)_d^+ \cdot (A^{d-})$ wherein:

L is an neutral Lewis base;

H is hydrogen;

$(L-H)^+$ is a Bronsted acid $A^{d-}$ is a non-coordinating anion having the charge d– d is an integer from 1 to 3.

The cation component, $(L-H)_d^+$ may include Bronsted acids such as protons or protonated Lewis bases or reducible Catalysts capable of protonating or abstracting a moiety, such as an alkyl or aryl, from the bulky ligand metallocene-type or Group 15 containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene and mixtures thereof. The activating cation $(L-H)_d^+$ may also be an abstracting moiety such as silver, carboniums, tropylium, carbeniums, ferroceniums and mixtures, preferably carboniums and ferroceniums. Most preferably $(L-H)_d^+$ is triphenyl carbonium.

The anion component $A^{d-}$ includes those having the formula $[M^{k+}Q_n]^{d-}$ wherein k is an integer from 1 to 3; n is an integer from 2-6; n–k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Most preferably, the ionic stoichiometric activator $(L-H)_d^+ \cdot (A^{d-})$ is N,N-dimethylanilinium tetra(perfluorophenyl)borate or triphenylcarbenium tetra(perfluorophenyl)borate.

In one embodiment, an activation method using ionizing ionic compounds not containing an active proton but capable of producing a bulky ligand metallocene-type catalyst cation and their non-coordinating anion are also contemplated, and are described in EP-A-0 426 637, EP-A-0 573 403 and U.S. Pat. No. 5,387,568, which are all incorporated herein by reference.

3. Additional Activators

Other activators include those described in PCT publication WO 98/07515 such as tris (2,2',2"-nonafluorobiphenyl) fluoroaluminate, which publication is fully incorporated herein by reference. Combinations of activators are also contemplated by the invention, for example, alumoxanes and ionizing activators in combinations, see, for example, EP-B1 0 573 120, PCT publications WO 94/07928 and WO 95/14044 and U.S. Pat. Nos. 5,153,157 and 5,453,410, all of which are fully incorporated herein by reference.

Other suitable activators are disclosed in WO 98/09996, incorporated herein by reference, which describes activating bulky ligand metallocene-type catalyst compounds with perchlorates, periodates and iodates including their hydrates.

WO 98/30602 and WO 98/30603, incorporated by reference, describe the use of lithium (2,2'-bisphenyl-ditrimethylsilicate).4THF as an activator for a bulky ligand metallocene-type catalyst compound. WO 99/18135, incorporated herein by reference, describes the use of organo-boron-aluminum activators. EP-B1-0 781 299 describes using a silylium salt in combination with a non-coordinating compatible anion. Also, methods of activation such as using radiation (see EP-B1-0 615 981 incorporated herein by reference), electrochemical oxidation, and the like are also contemplated as activating methods for the purposes of rendering the neutral bulky ligand metallocene-type catalyst compound or precursor to a bulky ligand metallocene-type cation capable of polymerizing olefins. Other activators or methods for activating a bulky ligand metallocene-type catalyst compound are described in for example, U.S. Pat. Nos. 5,849,852; 5,859,653; 5,869,723 and WO 98/32775, WO 99/42467 (dioctadecylmethylammonium-bis(tris(pentafluorophenyl)borane) benzimidazolide), which are incorporated herein by reference.

Another suitable ion forming, activating cocatalyst comprises a salt of a cationic oxidizing agent and a noncoordinating, compatible anion represented by the formula:

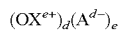

wherein $OX^{e+}$ is a cationic oxidizing agent having a charge of e+; e is an integer from 1 to 3; and $A^-$, and d are as previously defined. Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activators, especially tetrakis(pentafluorophenyl)borate.

It is within the scope of this invention that catalyst compounds can be combined one or more activators or activation methods described above. For example, a combination of activators have been described in U.S. Pat. Nos. 5,153,157; 5,453,410; European publication EP-B1 0 573 120, and PCT publications WO 94/07928 and WO 95/14044. These documents all discuss the use of an alumoxane and an ionizing activator with a bulky ligand metallocene-type catalyst compound.

4. Supported Activators

Many supported activators are described in various patents and publications which include: U.S. Pat. No. 5,728,855 directed to the forming a supported oligomeric alkylaluminoxane formed by treating a trialkylaluminum with carbon dioxide prior to hydrolysis; U.S. Pat. Nos. 5,831,109 and 5,777,143 discusses a supported methylalumoxane made using a non-hydrolytic process; U.S. Pat. No. 5,731,451 relates to a process for making a supported alumoxane by oxygenation with a trialkylsiloxy moiety, U.S. Pat. No. 5,856,255 discusses forming a supported auxiliary catalyst (alumoxane or organoboron compound) at elevated temperatures and pressures; U.S. Pat. No. 5,739,368 discusses a process of heat treating alumoxane and placing it on a support; EP-A-0 545 152 relates to adding a metallocene to a supported alumoxane and adding more methylalumoxane; U.S. Pat. Nos. 5,756,416 and 6,028,151 discuss a catalyst composition of an alumoxane impregnated support and a metallocene and a bulky aluminum alkyl and methylalumoxane; EP-B1-0 662 979 discusses the use of a metallocene with a catalyst support of silica reacted with alumoxane; PCT WO 96/16092 relates to a heated support treated with alumoxane and washing to remove unfixed alumoxane; U.S. Pat. Nos. 4,912,075; 4,937,301; 5,008,228; 5,086,025; 5,147,949; 4,871,705; 5,229,478; 4,935,397; 4,937,217; and 5,057,475 and PCT WO 94/26793 all directed to adding a metallocene to a supported activator; U.S. Pat. No. 5,902,766 relates to a supported activator having a specified distribution of alumoxane on the silica particles; U.S. Pat. No. 5,468,702 relates to aging a supported activator and adding a metallocene; U.S. Pat. No. 5,968,864 discusses treating a solid with alumoxane and introducing a metallocene; EP 0 747 430 A1 relates to a process using a metallocene on a supported methylalumoxane and trimethylaluminum; EP 0 969 019 A1 discusses the use of a metallocene and a supported activator; EP-B2-0 170 059 relates to a polymerization process using a metallocene and an organoaluminum compound, which is formed by reacting aluminum trialkyl with a water containing support; U.S. Pat. No. 5,212,232 discusses the use of a supported alumoxane and a metallocene for producing styrene based polymers; U.S. Pat. No. 5,026,797 discusses a polymerization process using a solid component of a zirconium compound and a water-insoluble porous inorganic oxide preliminarily treated with alumoxane; U.S. Pat. No. 5,910,463 relates to a process for preparing a catalyst support by combining a dehydrated support material, an alumoxane and a polyfunctional organic crosslinker; U.S. Pat. Nos. 5,332,706; 5,473,028; 5,602,067 and 5,420,220 discusses a process for making a supported activator where the volume of alumoxane solution is less than the pore volume of the support material; WO 98/02246 discusses silica treated with a solution containing a source of aluminum and a metallocene; WO 99/03580 relates to the use of a supported alumoxane and a metallocene; EP-A1-0 953 581 discloses a heterogeneous catalytic system of a supported alumoxane and a metallocene; U.S. Pat. No. 5,015,749 discusses a process for preparing a polyhydrocarbyl-alumoxane using a porous organic or inorganic imbiber material; U.S. Pat. Nos. 5,446,001 and 5,534,474 relate to a process for preparing one or more alkylaluminoxanes immobilized on a solid, particulate inert support; and EP-A1-0 819 706 relates to a process for preparing a solid silica treated with alumoxane. Also, the following articles, also fully incorporated herein by reference for purposes of disclosing useful supported activators and methods for their preparation, include: W. Kaminsky, et al., "Polymerization of Styrene with Supported Half-Sandwich Complexes," *Journal of Polymer Science*, Vol. 37, pp. 2959-2968, (1999), describes a process of adsorbing a methylalumoxane to a support followed by the adsorption of a metallocene; Junting Xu, et al. "Characterization of isotactic polypropylene prepared with dimethylsilyl bis(1-indenyl)zirconium dichloride supported on methylaluminoxane pretreated silica," *European Polymer Journal*, 35 (1999), pp. 1289-1294, discusses the use of silica treated with methylalumoxane and a metallocene; Stephen O'Brien, et al., "EXAFS analysis of a chiral alkene polymerization catalyst incorporated in the mesoporous silicate MCM-41," *Chem. Commun.*, 1905-1906 (1997) discloses an immobilized alumoxane on a modified mesoporous silica; and F. Bonini, et al., "Propylene Polymerization through Supported Metallocene/MAO Catalysts: Kinetic Analysis and Modeling," *Journal of Polymer Science*, Vol. 33, pp. 2393-2402 (1995) discusses using a methylalumoxane supported silica with a metallocene. Any of the methods discussed in these references are useful for producing the supported activator component utilized in the catalyst composition of the invention and all are incorporated herein by reference.

In another embodiment, the supported activator, such as supported alumoxane, is aged for a period of time prior to use herein. For reference please refer to U.S. Pat. Nos. 5,468,702 and 5,602,217, incorporated herein by reference.

In an embodiment, the supported activator is in a dried state or a solid. In another embodiment, the supported activator is in a substantially dry state or a slurry, preferably in a mineral oil slurry.

In another embodiment, two or more separately supported activators are used, or alternatively, two or more different activators on a single support are used.

In another embodiment, the support material, preferably partially or totally dehydrated support material, preferably 200° C. to 600° C. dehydrated silica, is then contacted with an organoaluminum or alumoxane compound. Preferably in an embodiment where an organoaluminum compound is used, the activator is formed in situ on and in the support material as a result of the reaction of, for example, trimethylaluminum and water.

In another embodiment, Lewis base-containing supports are reacted with a catalyst activator to form a support bonded catalyst compound. The Lewis base hydroxyl groups of silica are exemplary of metal/metalloid oxides where this method of bonding to a support occurs. This embodiment is described in U.S. Pat. No. 6,147,173, which is incorporated herein by reference.

Other embodiments of supporting an activator are described in U.S. Pat. No. 5,427,991, where supported non-coordinating anions derived from trisperfluorophenyl boron are described; U.S. Pat. No. 5,643,847 discusses the reaction of Group 13 catalyst compounds with metal oxides such as silica and illustrates the reaction of trisperfluorophenyl boron with silanol groups (the hydroxyl groups of silicon) resulting in bound anions capable of protonating transition metal organometallic catalyst compounds to form catalytically active cations counter-balanced by the bound anions; immobilized Group IIIA Catalyst catalysts suitable for carbocationic polymerizations are described in U.S. Pat. No. 5,288,677; and James C. W. Chien, *Jour. Poly. Sci.: Pt A: Poly. Chem*, Vol. 29, pp. 1603-1607, (1991), describes the olefin polymerization utility of methylalumoxane (MAO) reacted with silica ($SiO_2$) and metallocenes and describes a covalent bonding of the aluminum atom to the silica through an oxygen atom in the surface hydroxyl groups of the silica.

In a preferred embodiment, a supported activator is formed by preparing in an agitated, and temperature and pressure controlled vessel a solution of the activator and a suitable solvent, then adding the support material at temperatures from 0° C. to 100° C., contacting the support with the activator solution for up to 24 hours, then using a combination of heat and pressure to remove the solvent to produce a free flowing powder. Temperatures can range from 40 to 120° C. and pressures from 5 psia to 20 psia (34.5 to 138 kPa). An inert gas sweep can also be used to assist in removing solvent. Alternate orders of addition, such as slurrying the support material in an appropriate solvent then adding the activator, can be used.

In another embodiment a support is combined with one or more activators and is spray dried to form a supported activator. In a preferred embodiment, fumed silica is combined with methyl alumoxane and then spray dried to from supported methyl alumoxane. Preferably a support is combined with alumoxane, spray dried and then placed in mineral oil to form a slurry useful in the instant invention.

D. Cocatalysts

Cocatalysts that can be used according to this invention include one or more cocatalysts represented by the formula:

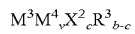

wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415, which are fully incorporated herein by reference.

E. Spray Dried Catalysts

In another embodiment, the catalyst compounds described are combined with support material(s) and/or activator(s) and spray dried. In another embodiment, the catalyst compounds and/or the activators are combined with a support material such as a particulate filler material and then spray dried, preferably to form a free flowing powder.

Spray drying may be by any means known in the art. Please see EP A 0 668 295 B1, U.S. Pat. No. 5,674,795 and U.S. Pat. No. 5,672,669 and U.S. patent application Ser. No. 09/464, 114, filed Dec. 16, 1999, which particularly describes spray drying of supported catalysts. In general, one may spray dry the catalysts by placing the catalyst compound and the optional activator in solution (allowing the catalyst compound and activator to react, if desired), adding a filler material such as silica or fumed silica, such as Gasil™ or Cabosil™, then forcing the solution at high pressures through a nozzle. The solution may be sprayed onto a surface or sprayed such that the droplets dry in midair. The method generally employed is to disperse the silica in toluene, stir in the activator solution, and then stir in the catalyst compound solution. Typical slurry concentrations are about 5 to 8 wt %. This formulation may sit as a slurry for as long as 30 minutes with mild stirring or manual shaking to keep it as a suspension before spray-drying. In one preferred embodiment, the makeup of the dried material is about 40-50 wt % activator (preferably alumoxane), 50-60 SiO$_2$ and about ~2 wt % catalyst compound.

In another embodiment, fumed silica such as Gasil™ or Cabosil™ may be added to a solution containing a catalyst compound such that when that solution is added to the catalyst component slurry or injected into a polymerization reactor, the fumed silica acts as a template for "in situ spray" drying.

For simple catalyst compound mixtures, the two or more catalyst compounds can be added together in the desired ratio in the last step. In another embodiment, more complex procedures are possible, such as addition of a first catalyst compound to the activator/filler mixture for a specified reaction time t, followed by the addition of the second catalyst compound solution, mixed for another specified time x, after which the mixture is cosprayed. Lastly, another additive, such as 1-hexene in about 10 volume % can be present in the activator/filler mixture prior to the addition of the first metal catalyst compound.

In another embodiment, binders are added to the mix. These can be added as a means of improving the particle morphology, i.e., narrowing the particle size distribution, lower porosity of the particles and allowing for a reduced quantity of alumoxane, which is acting as the 'binder'.

In another embodiment, a solution of a bulky ligand metallocene-type compound and optional activator can be combined with a different slurried spray dried catalyst compound and then introduced into a reactor.

The spray dried particles are generally fed into the polymerization reactor as a mineral oil slurry. Solid concentrations in oil are about 10 to 30 weight %, preferably 15 to 25 weight %. In some embodiments, the spray dried particles can be from less than about 10 micrometers in size up to about 100 micrometers, compared to conventional supported catalysts which are about 50 micrometers. In a preferred embodiment the support has an average particle size of 1 to 50 microns, preferably 10 to 40 microns.

F. Catalyst Slurry and Solution Components

The catalyst of the invention can be added to the reaction system in the form of a slurry or a solution or a combination of slurry and solution. In one embodiment, the catalyst is in slurry form and includes an activator and a support, or a supported activator. In another embodiment, the catalyst slurry includes fumed silica. In another embodiment, the slurry includes a catalyst compound in addition to the activator and the support and/or the supported activator. In one embodiment, the catalyst compound in the slurry is supported.

In another embodiment, the slurry includes one or more activator(s) and support(s) and/or supported activator(s) and/or one more catalyst compound(s). For example, the slurry may include two or more activators (such as a supported alumoxane and a modified alumoxane) and a catalyst compound, or the slurry may include a supported activator and more than one catalyst compound. Preferably, the slurry comprises a supported activator and two catalyst compounds.

In another embodiment, the slurry comprises a supported activator and two different catalyst compounds, which may be added to the slurry separately or in combination.

In another embodiment, the slurry, containing a supported alumoxane, is contacted with a catalyst compound, allowed to react, and thereafter the slurry is contacted with another catalyst compound. In another embodiment, the slurry containing a supported alumoxane is contacted with two catalyst compounds at the same time, and allowed to react.

In another embodiment, the molar ratio of metal in the activator to metal in the catalyst compound in the slurry is 1000:1 to 0.5:1, preferably 300:1 to 1:1, more preferably 150:1 to 1:1.

In another embodiment, the slurry contains a support material which may be any inert particulate carrier material known in the art, including, but not limited to, silica, fumed silica, alumina, clay, talc or other support materials such as disclosed above. In a preferred embodiment, the slurry contains a supported activator, such as those disclosed above, preferably methyl alumoxane and/or modified methyl alumoxane on a support of silica.

A catalyst slurry can be prepared by suspending the catalyst components, preferably the support, the activator and optional catalyst compounds in a liquid diluent. The liquid diluent is typically an alkane having from 3 to 60 carbon atoms, preferably having from 5 to 20 carbon atoms, preferably a branched alkane, or an organic composition such as mineral oil or silicone oil. The diluent employed is preferably liquid under the conditions of polymerization and relatively inert. The concentration of the components in the slurry is controlled such that a desired ratio of catalyst compound(s) to activator, and/or catalyst compound to catalyst compound is fed into the reactor.

Typically, as a slurry, the catalyst compound and the support and activator, or supported activator, and the slurry diluent are allowed to contact each other for a time sufficient for at least 50% of the catalyst compounds to be deposited into or on the support, preferably at least 70%, preferably at least 75%, preferably at least 80%, more preferably at least 90%, more preferably at least 95%, more preferably at least 99%. In an embodiment, the slurry is prepared prior to its use in the catalyst feed system. Times allowed for mixing are up to 10 hours, typically up to 6 hours, more typically 4 to 6 hours. In one embodiment of this invention, a catalyst compound will be considered to be in or on the support if the concentration of the catalyst compound in the liquid portion of the slurry is reduced over time after adding the catalyst compound to the slurry. Concentration of the catalyst compound in the liquid diluent may be measured, for example, by inductively coupled plasma spectroscopy (ICPS), or by ultraviolet (UV) spectroscopy, after standardization with a calibration curve prepared at the appropriate concentration range, as is known in the art. Thus, for example, 70% of a catalyst compound will be considered to have deposited in or on a support if the concentration of the catalyst compound in the liquid (not including the support) is reduced by 70% from its initial concentration.

In one embodiment, the catalyst compounds are added to the slurry as a solution, slurry, or powder. The slurry may be prepared prior to its use in the polymerization process of the invention or it may be prepared in-line.

In one embodiment, the slurry is prepared by combining the catalyst components, for example, the catalyst or supported catalyst and the support and activator or supported activator, all at once. In another embodiment, the slurry is prepared by first adding a support material, then adding the combination of a catalyst and an activator component.

In another embodiment, the slurry comprises a supported activator and at least one catalyst compound where the catalyst compound is combined with the slurry as a solution. A preferred solvent is mineral oil.

In another embodiment, alumoxane, preferably methyl alumoxane or modified methyl alumoxane, is combined with a support such as calcined silica or fumed silica to form a supported activator, the supported activator is then dispersed in a liquid, such as degassed mineral oil, and then one or more catalyst compounds are added to the dispersion and mixed to form the catalyst component slurry. The catalyst compounds are preferably added to the dispersion as a solid, powder, solution or a slurry, preferably a slurry of mineral oil. If more than one catalyst compound is added to the dispersion, the catalyst compounds can be added sequentially, or at the same time.

In a preferred embodiment, the slurry comprises mineral oil and has a viscosity of about 130 to about 2000 cP at 20° C., more preferably about 180 to about 1500 cP at 20° C. and even more preferably about 200 to about 800 cP at 20° C. as measured with a Brookfield model LVDV-III Rheometer housed in a nitrogen purged drybox (in such a manner that the atmosphere is substantially free of moisture and oxygen, i.e., less than several ppmv of each). The slurry can be made in a nitrogen purged drybox, and rolled in closed glass containers until immediately before the viscosity measurements are made, in order to ensure that it is fully suspended at the start of the trial.

In one embodiment, the slurry comprises a supported activator and one or more or a combination of the catalyst compound(s). In another embodiment, the slurry comprises a supported activator and one or more or combination of the bulky ligand catalyst compound(s) represented by Formula I to IV described above.

In one embodiment, the catalyst is added to the reaction system as a solution that includes a catalyst compound. In another embodiment, the solution also includes an activator in addition to the catalyst compound.

The solution used in the process of this invention is typically prepared by dissolving the catalyst compound and optional activators in a liquid solvent. The liquid solvent is typically an alkane, such as a $C_5$ to $C_{30}$ alkane, preferably a $C_5$ to $C_{10}$ alkane. Cyclic alkanes such as cyclohexane and aromatic compounds such as toluene may also be used. In addition, mineral oil may be used as a solvent. The solution employed should be liquid under the conditions of polymerization and relatively inert. In one embodiment, the liquid utilized in the solution is different from the diluent used in the slurry. In another embodiment, the liquid utilized in the solution is the same as the diluent used in the slurry.

In a preferred embodiment, the ratio of metal in the activator to metal in the catalyst compound in the solution is 1000:1 to 0.5:1, preferably 300:1 to 1:1, more preferably 150:1 to 1:1.

In a preferred embodiment, the activator and catalyst compound is present in the solution at up to about 90 weight %, preferably at up to about 50 weight %, preferably at up to about 20 weight %, preferably at up to about 10 wt %, more preferably at up to about 5 wt %, more preferably at less than 1 wt %, more preferably between 100 ppm and 1 weight % based upon the weight of the solvent and the activator or catalyst compound.

In one embodiment, the solution comprises a bulky ligand catalyst compound represented by Formula I to IV described above.

In the polymerization process of the invention, any catalyst solutions may be combined with any catalyst containing slurry. In addition, more than one catalyst component may be utilized.

IV. Homopolymers and Copolymers

The processes described herein can be used in any type of polymerization process employing propylene to make propylene homopolymers and optionally one or more comonomers to make propylene copolymers. Slurry processes are preferred, and the use of one or more of the optional comonomers can act to provide a copolymer that has a lower melting temperature and crystallinity compared to the propylene homopolymer.

Typical comonomers that can be included with propylene in the olefin feed to the polymerization process of the invention include one or more unsaturated hydrocarbons having 2 or from 4 to 30 carbon atoms, preferably 2 or from 4 to 12 carbon atoms, and more preferably 2 or from 4 to 8 carbon atoms. Useful comonomers include one or more linear, branched or cyclic olefins; linear branched or cyclic alpha olefins; linear, branched or cyclic diolefins; linear branched or cyclic alpha-omega olefins; linear, branched or cyclic polyenes; linear branched or cyclic alpha olefins. Particularly, preferred comonomers include one or more of ethylene, butene-1, pentene-1,4-methyl-pentene-1, hexene-1, octene-1, decene-1,3-methyl-pentene-1, norbornene, norbornadiene, 3,5,5-trimethyl-1-hexene, 5-ethyl-1-nonene, vinyl norbornene, and ethylidene monomers.

Preferred cyclic containing comonomers include aromatic-group-containing comonomers containing up to 30 carbon atoms and non aromatic cyclic group containing comonomers containing up to 30 carbon atoms. Suitable aromatic-group-containing comonomers comprise at least one aromatic structure, preferably from one to three, more preferably a phenyl, indenyl, fluorenyl, or naphthyl moiety. The aromatic group-containing comonomer further comprises at least one polymerizable double bond such that after polymerization, the aromatic structure will be pendant from the polymer backbone. The aromatic-group containing comonomer may further be substituted with one or more hydrocarbyl groups including but not limited to $C_1$ to $C_{10}$ alkyl groups. Additionally, two adjacent substitutions may be joined to form a ring structure. Preferred aromatic-group-containing comonomers contain at least one aromatic structure appended to a polymerizable olefinic moiety. Particularly preferred aromatic comonomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene. Suitable non-aromatic cyclic group containing comonomers preferably have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. Preferred non-aromatic cyclic group containing comonomers include vinylcyclohexane, vinylcyclohexene, vinylnorbornene, ethylidene norbornene, cyclopentadiene, cyclopentene, cyclohexene, cyclobutene, vinyladamantane and the like.

Preferred diolefin comonomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin comonomers be selected from alpha,omega-diene monomers (i.e., di-vinyl monomers). More preferably, the diolefin comonomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

The polymer produced herein is a propylene homopolymer or copolymer. In a particularly preferred embodiment, the process of this invention relates to the polymerization of propylene and ethylene, and optionally one or more $C_4$ to $C_{20}$ linear, branched or cyclic monomers, preferably $C_4$ to $C_{12}$ linear or branched alpha-olefins. In a preferred embodiment, when both ethylene and an optional comonomer are included, the comonomer comprises at least one comonomer having from 4 to 8 carbon atoms. Particularly, in an embodiment when ethylene and one or more comonomers are included, the one or more comonomers are selected from the group consisting of, butene-1,4-methyl-pentene-1,3-methyl-pentene-1, hexene-1 and octene-1.

In another embodiment, propylene is polymerized with at least two different comonomers to form a terpolymer. Preferably, one of the comonomers is ethylene. Additional preferred comonomers include alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/norbornene and the like.

In one embodiment of the invention, polymer is made by mixing together a diluent containing at least one fluorinated hydrocarbon, a bulky ligand metallocene-type catalyst system, and an olefin feed containing propylene and optionally one or more comonomers. Preferably, the olefin feed that is mixed to form the polymer contains a substantial amount of propylene, preferably at least 92 weight % propylene, based on total weight of the olefin feed. In another embodiment, the olefin feed contains at least 94 weight % propylene, or at least 96 weight % propylene, or at least 98 weight % propylene, based on total weight of the olefin feed. Preferably, in one embodiment, the olefin feed contains substantially 100 weight % olefin, based on total weight of olefin in the feed, to produce a propylene homopolymer.

In another embodiment of the invention, a copolymer is produced wherein the copolymer is made from an olefin feed that contains ethylene at not greater than 15 weight % ethylene, preferably not greater than 10 weight % ethylene, based on total weight of the olefin feed. In another embodiment, the olefin feed contains less than 8 weight % ethylene, or less than 6 weight % ethylene, or less than 4 weight % ethylene, or less than 2 weight % ethylene, based on total weight of the olefin feed. In another embodiment, a copolymer is produced wherein the copolymer is made from an olefin feed that contains at least 0.5 weight % ethylene, based on total weight of the olefin feed. Generally, the olefin feed contains from 0.5 to 10 weight % ethylene, based on total weight of the olefin feed. Preferably, the olefin feed contains from 1 to 8 weight % ethylene, or from 1 to 6 weight % ethylene, or from 1 to 4 weight % ethylene, based on total weight of the olefin feed.

In another embodiment of the invention, a copolymer is produced by using an olefin feed that contains at least 25 weight % propylene, or at least 30 weight % propylene, or at least 40 weight % propylene, or at least 50 weight % propylene, or at least 60 weight % propylene, or at least 70 weight % propylene. Preferably, the olefin feed also includes greater than 10 weight % ethylene, based on total weight of the olefin feed. In one embodiment, a copolymer is produced by using an olefin feed that contains less than 90 weight % propylene, based on total weight of the olefin feed. More preferably, a copolymer is produced by using an olefin feed that contains from 25 weight % to less than 90 weight % propylene, based on total weight of the olefin feed.

In another embodiment, the olefin feed from which the polymer is made contains from 40 weight % to less than 90 weight % propylene, based on total weight of the olefin feed. In another embodiment, the olefin feed contains from 50 weight % to less than 90 weight % propylene, based on total weight of the olefin feed.

According to another aspect of the invention, a copolymer of propylene and ethylene is made from an olefin feed containing a wide range of ethylene. In one embodiment, the olefin feed contains less than 75 weight % ethylene, based on total weight of the olefin feed. In yet another, the olefin feed contains less than 60 weight %, or less than 50 weight %, or less than 25 weight % ethylene, or less than 15 weight % ethylene, based on total weight of the olefin feed. In another embodiment, the olefin feed contains at least 20 weight % ethylene, based on total weight of the olefin feed.

Preferably, the olefin feed contains greater than 10 weight % and less than 75 weight % ethylene, based on total weight of the olefin feed. Alternatively, the olefin feed contains from 15 weight % to 60 weight % ethylene, or from 15 weight % to 50 weight % ethylene, or from 15 weight % to 40 weight % ethylene, based on total weight of the olefin feed.

V. Process Conditions

A. General Process Conditions and Reactor Systems

This invention pertains to any prepolymerization and/or polymerization process, and the process is suitably carried out over a wide range of temperatures and pressures. Such processes include, for example, solution, gas phase, slurry phase, medium pressure and high pressure processes or any combination thereof.

Desirably, little to no polymer "swelling" is exhibited as indicated by little or no suppression of the polymer melting temperature, Tm, or glass transition temperature, Tg, and/or little or no diluent mass uptake. Thus, polymerization in the diluents of the present invention provides for high polymer concentration to be handled at low viscosity with good heat transfer, reduced reactor fouling, homogeneous polymerization and/or the convenience of subsequent reactions to be run directly on the resulting polymer mixture.

Polymerization processes according to this invention are carried out at any temperature or temperature range effective in carrying out the polymerization process. In general, effective temperatures range from about 20° C. to 160° C. More specific ranges include from about 10° C. to 140° C., and more preferably from about 20° C. to 120° C. Lower temperatures are particularly preferred to provide an added benefit of forming discrete particles of the polymer. Preferred lower temperatures include those temperatures at which the polymerization is carried out at a temperature of less than 100° C., more preferably less than 80° C., and most preferably less than 60° C. Preferably, the polymerization temperature is above room temperature (23° C.), preferably above 25° C., preferably above 27° C., preferably above 30° C., preferably above 50° C., preferably above 70° C.

Polymerization processes according to this invention are carried out at any pressure or pressure range effective in carrying out the polymerization process. The pressures employed may be in the range from 1 mm Hg (133 Pa) to about 3500 bar (350 MPa), preferably from 0.5 bar (50 kPa) to about 500 bar (50 MPa), more preferably from about 1 bar (100 kPa) to about 100 bar (10 MPa), and most preferably from about 5 bar to about 50 bar (5 MPa).

In one embodiment, one or more of the monomers are prepolymerized. Prepolymerization is particularly preferred to provide an added benefit of forming discrete particles of the polymer. In one embodiment of the invention, propylene is prepolymerized prior to polymerization with any other comonomer such as ethylene. One or more comonomers such as ethylene or one or more $C_4$ to $C_{30}$ olefin(s) or alpha-olefin(s), can also be prepolymerized with propylene in the presence of the catalyst systems of the invention described above prior to the main polymerization.

In one embodiment, the prepolymerization process is carried out in a slurry phase at effective prepolymerization temperatures and pressures, such as those temperatures and pressures described herein for the polymerization process. Prepolymerization can take place with any olefin monomer or combination and/or in the presence of any molecular weight controlling agent such as hydrogen. For examples of prepolymerization procedures, see U.S. Pat. Nos. 4,748,221; 4,789,359; 4,923,833; 4,921,825; 5,283,278; 5,705,578 and European publication EP-B-0279 863 and PCT Publication WO 97/44371, all of which are fully incorporated herein by reference.

The prepolymerization and/or polymerization process can be carried out in a batch or continuous process. By continuous is meant a system that operates (or is intended to operate) without interruption or cessation. For example, a continuous process to produce a polymer would be one in which the reactants are continuously introduced into one or more reactors and polymer product is continually withdrawn. In a preferred embodiment any of the polymerization process of the invention is a continuous process.

In one embodiment, the polymerization is carried out where the catalyst, monomer, and diluent are present in a single phase. In a preferred embodiment, polymerization is carried out as a continuous polymerization process in which catalyst, monomer, and diluent are present in a single phase.

The reactor used in the polymerization process of this invention will contain sufficient amounts of the catalyst system effective to catalyze the polymerization of the monomer containing feed-stream such that a sufficient amount of polymer having desired characteristics is produced. The feed stream in one embodiment contains a total monomer concentration greater than 5 wt % (based on the total weight of the monomers, diluent, and catalyst system), preferably greater than 15 wt %, greater than 30 wt % in another embodiment. In yet another embodiment, the feed-stream will contain from 5 wt % to 50 wt % monomer concentration based on the total weight of monomer, diluent, and catalyst system.

In one embodiment of the invention, hydrogen is added to the reactor for molecular weight control. As is well known to those skilled in the art, increased concentrations of hydrogen relative to the concentration of monomer(s) in the reactor cause the production of polymer of lower number average and weight average molecular weights.

B. Slurry Phase

One embodiment of the invention incorporates the use of a slurry phase polymerization process, preferably as a continuous polymerization process. The slurry polymerization process can be carried out at various pressures as noted above, preferably in the range of from about 1 to about 100 atmospheres, more preferably in the range of from 1 to 50 atmospheres. Operating temperatures are generally in the range as described above.

In one embodiment of the slurry process, the monomers, catalyst(s), and initiator(s) are miscible in the diluent or diluent mixture, i.e., constitute a single phase, while the polymer precipitates from the diluent with good separation from the diluent. In one embodiment, a solvent or co-diluent is added to the reaction process. In a particular embodiment, an alkane having from 3 to 7 carbon atoms, preferably a branched alkane, is added. Preferred alkanes include isobutane and isohexane.

A preferred polymerization technique of the invention is referred to as a particle form polymerization, which is essentially a slurry process utilizing a supported catalyst wherein the temperature is kept below the temperature at which the polymer goes into solution. An example of such a technique is described in U.S. Pat. No. 3,248,179, which is fully incorporated herein by reference. Other slurry processes include those employing one or more of a loop reactor or a stirred tank reactor. A plurality of such reactors can be used in series, parallel, or combinations thereof. Non-limiting examples of slurry processes include continuous loop or stirred tank processes. Also, other examples of slurry processes are described in U.S. Pat. Nos. 4,613,484 and 5,986,021, which are fully incorporated herein by reference. Such combinations of stirred slurry, loop slurry, or stirred and loop slurry reactors are useful for production of bimodal polymers.

In one embodiment, the reactor used in the slurry process of the invention is capable of producing greater than 2000 lbs of polymer per hour (907 kg/hr), more preferably greater than 5000 lbs/hr (2268 kg/hr), and most preferably greater than 10,000 lbs/hr (4540 kg/hr). In another embodiment, the slurry reactor used in the process of the invention is capable of producing greater than 15,000 lbs of polymer per hour (6804 kg/hr), preferably greater than 25,000 lbs/hr (11,340 kg/hr) to about 100,000 lbs/hr (45,500 kg/hr).

In one embodiment, polymer granules and supported catalyst particles are present as solid particles in the slurry reactor, and the slurry diluent is a fluorinated hydrocarbon, one or more hydrocarbons, or mixtures thereof. In one embodiment, the concentration of solid particles in the slurry is equal to or greater than 10 volume %. In another embodiment, the solid particles are present in the slurry at a concentration equal to or greater than 25 volume %. In yet another embodiment, the solid particles are present in the slurry at a concentration less than or equal to 75 volume %. In yet another embodiment, the solid particles are present in the slurry at concentrations ranging from 1 to 70 volume %; from 5 to 70 volume %; from 10 to 70 volume %; from 15 to 70 volume %; from 20 to 70 volume %; from 25 to 70 volume %; from 30 to 70 volume %; or from 40 to 70 volume %.

C. Reactors and Reactor Systems

One or more reactors in series or in parallel may be used in this invention. Catalyst component(s) (and any activator employed) may be delivered as a solution or slurry, either separately to the reactor, activated in-line just prior to the reactor, or preactivated and pumped as an activated solution or slurry to the reactor. A preferred operation is two solutions activated in-line. Examples of methods for introducing multiple catalysts into reactors are found in U.S. Pat. No. 6,399,722 and WO 01/30861 A1, which are incorporated herein by reference. While these references may emphasize gas phase reactors, the techniques described are equally applicable to other types of reactors, including stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst component may also be added to both reactors, with one component being added to a first reactor and other components added to other reactors.

In one embodiment, a continuous flow stirred tank-type reactor is used. The reactor is generally fitted with an efficient agitation means, such as a turbo-mixer or impeller(s), an external cooling jacket and/or internal cooling tubes and/or coils, or other means of removing the heat of polymerization to maintain the desired reaction temperature, inlet means (such as inlet pipes) for monomers, diluents and catalysts (combined or separately), temperature sensing means, and an effluent overflow or outflow pipe which withdraws polymer, diluent and unreacted monomers among other things, to a holding drum or quench tank. Preferably, the reactor is purged of air and moisture. One skilled in the art will recognize proper assembly and operation. The reactors are preferably designed to deliver good mixing of the catalyst and monomers within the reactor, good turbulence across or within the heat transfer tubes or coils, and enough fluid flow throughout the reaction volume to avoid excessive polymer accumulation or separation from the diluent.

In another embodiment of the invention, a reactor capable of performing a continuous slurry process is used. A reactor pump impeller is generally employed in the reactor and can be of the up-pumping variety or the down-pumping variety. The overall residence time in the reactor can vary, depending upon, for example, catalyst activity and concentration, monomer concentration, feed injection rate, production rate, reaction temperature, and desired molecular weight. Residence time will generally be between about a few seconds and five hours, and typically between about 10 and 60 minutes. A variable influencing residence time is the monomer and diluent feed injection rates and the overall reactor volume.

Polymer product that leaves the reactor unit of the reaction system contains entrained material that is preferably separated from the polymer. Included in this polymer product are unreacted monomers and undesirable hydrocarbon by-products of the reaction process. Also included are any diluent and/or solvent materials that are not reactive to form desirable polymer, and are especially problematic with regard to removal and/or recovery.

A substantial portion (i.e., a majority) of the polymer product is separated from the non-polymer product by sending product effluent from the polymer reactor to a polymer recovery system. The polymer recovery system is operated by controlling a variety of parameters including temperature, pressure, vapor-liquid separation systems, and purge systems or vessels.

In one embodiment, the polymer recovery system incorporates the use of an inert gas to purge or scrub out undesirable entrained material from the polymer product. The inert gas is a composition that is substantially non-reactive with the polymer product, and can be used in sufficient quantity as a driving force to separate the non-polymer components from the polymer product. Examples of useful inert gases include air and nitrogen.

In a particular embodiment, polymer associated with entrained materials such as unreacted monomer, hydrocarbon by-product and diluent such as fluorinated hydrocarbon is recovered from a polymerization reaction process and sent to a polymer recovery system. Preferably, the polymer recovery system includes a purge system or vessel, more preferably a purge bin, and the polymer and associated entrained materials are sent to the purge system. The inert gas composition is then input into the purge system to purge or drive out the entrained materials, thereby forming a purge stream, which is recovered from the purge system.

Entrained, non-polymer product material that is separated and recovered as a purge stream from the polymer product is preferably further separated into component fractions or a plurality of streams and each fraction or stream stored, recycled or vented from the system as appropriate. It is preferred that diluent and unreacted monomer be separated and returned to the reactor. These streams can be separated and recovered as individual streams or as a combined stream. If an inert gas is used in the recovery system, it is preferred that the inert gas also be separated, preferably as an individual stream, and recovered for re-use in the polymer recovery system and/or in the reaction portion of the polymerization system.

In one embodiment, the effluent from the polymerization reactor is flashed in a first flash to vaporize from about 50% to about 100% of the liquid medium to produce concentrated polymer effluent and vaporized liquid. Flashing can be accomplished by reducing pressure or by heating. Preferably, the vapor obtained in the first flash is condensed, more preferably the vapor is condensed without compression, and most preferably is compressed by heat exchange. Preferably, the first flash is operated at from about 140 psia (965 kPa) to about 315 psia (2.2 MPa).

In another embodiment, the fluorocarbon is condensed and recycled. In another embodiment, polymer solids are discharged from a first flash to a second flash through a seal chamber. The seal chamber preferably is of sufficient dimension such as to maintain a volume of polymer solids/slurry in the seal chamber sufficient to maintain a pressure seal.

In another embodiment, concentrated polymer effluent and vaporized liquid are continuously separated. In a preferred aspect, the concentrated polymer effluent slurry is flashed in a second flash to vaporize liquid.

In one embodiment of the invention, the polymerization effluent from the polymerization reactor is heated and then sent to a flash operation. Preferably, the polymerization effluent is heated to a temperature below the fusion temperature of the polymer. The quantity of heat supplied to the polymerization effluent is preferably at least equal to that quantity of heat which equals the heat of vaporization of the liquid medium which is to be flashed.

The polymer solids can be separated by any appropriate physical means as well. One non-limiting example is to separate the polymer solids from the diluent using a centrifuge apparatus.

In another embodiment, the residual fluorocarbon diluent present in a polymer produced with fluorocarbon is less than residual hydrocarbon present in a polymer produced with hydrocarbon under comparable processing conditions.

VI. Polymer Products

A. General Polymer Products

The polymers produced by the process of the invention can be used in a wide variety of products and end-use applications. The polymers produced by the process of the invention include elastomers, plastomers, thermoplastics, polypropylene and polypropylene copolymers.

B. Density

The polymers according to this invention can be produced at different crystallinity levels. For high moisture barrier applications, high molded part rigidity, others, polypropylene of high crystallinity is desired. For flexible films, seal layer films, tough films and molded parts and high clarity articles, polypropylenes of lower crystallinity are favored. Crystallinity can be measured by several techniques (see Polypropylene Handbook, Ed. E. P. Moore, Jr., etc.), of which density measurement is one. The density of commercial homopolymer, made via a 4th generation or later catalyst, is typically about 0.905 g/cm3. When the crystallinity is lowered, as when a comonomer is incorporated, the density decreases. Typical, commercial random copolymers (RCPs) containing about 6 wt % or so of comonomer (like ethylene) have density values about 0.890 g/cm3. At even higher comonomer levels, the density is further reduced because of the lower crystallinity. Density is measured in accordance with ASTM method 1505.

C. Crystallinity

Preferably, the polymers made according to this invention are low in crystallinity as measured by differential scanning calorimetry (DSC). In one embodiment, the polymers are exceptionally soft, while still retaining substantial tensile strength and elasticity.

In one embodiment of the invention, the polymer has crystallinity of greater than or equal to 10%. In another embodiment, the polymer has crystallinity of greater than or equal to 20%, or greater than or equal to 30%, or equal to 40%, or greater than or equal to 50%. Such an embodiment is particularly preferred with regard to propylene homopolymer.

In another embodiment, the polymer has a crystallinity that is relatively low, or in some cases, the polymer has little to no crystallinity. In such embodiments, the polymer has a crystallinity of not greater than 25%. In another embodiment, the crystallinity is not greater than 20% or 15% or 10% or 5% or 1%. Such embodiment are particularly preferred with regard to propylene copolymer, particularly propylene-ethylene copolymer.

D. Diene Content

In another embodiment of the invention, the polymer produced by this invention is substantially free of diene-derived units. Dienes are nonconjugated diolefins which may be incorporated in polymers to facilitate chemical crosslinking reactions. "Substantially free of diene" is defined to be less than 1% diene, or less than 0.5% diene, or less than 0.1% diene, or less than 0.05% diene, or equal to 0%. All of these percentages are by weight in the copolymer. The presence or absence of diene can be conventionally determined by conventional infrared techniques.

E. Melt Flow Rate

The invention is capable of producing a polymer having a Melt Flow Rate (MFR) as appropriate for the desired end use. For purposes of the invention, MFR is measured according to ASTM D 1238-95. In one embodiment, the polymer has a MFR in the range of from 0.2 to 5000 dg/min, preferably, from 0.4 to 3000 dg/min, and preferable from 1 to 2500 dg/min.

F. Melt Index

The invention is capable of producing a polymer having a melt index as appropriate for the desired end use. The melt index (MI) is preferably measured according to ASTM D 1238(B). In one embodiment, the polymer has a melt index of from about 1 dg/min to 3000 dg/min. Preferably, the polymer has a melt index of from about 10 dg/min to about 1000 dg/min, and most preferably from about 20 to about 750 dg/min. In a particular embodiment, a propylene copolymer can be produced that has a melt index of from about 10 dg/min to about 2500 dg/min, or from about 15 dg/min to about 2000 dg/min.

G. Melting Point

The invention is capable of producing a polymer having a melting temperature or melting point as appropriate for the desired end use. In one embodiment, a polymer is produced having a melting point, as measured by Differential Scanning Calorimetry (DSC) analysis (ASTM E-794-95), greater than or equal to 75° C. In another embodiment, the polymer has a melting point of greater than or equal to 95° C. or greater than or equal to 100° C. In a preferred embodiment, the polymer has a melting point in a range of from about 50° C. to 200° C., preferably in the range of from about 60° C. to 190° C., more preferably in the range of from about 70° C. to about 180° C.

H. Heat of Fusion

The invention is capable of producing a polymer having a relatively low heat of fusion. In one embodiment, the polymer that is produced has a heat of fusion of not greater than 140 J/g. In another embodiment, the polymer has a heat of fusion not greater than 110 J/g, or 100 J/g, or 80 J/g, as determined by DSC.

A preferred procedure used in the present application for Differential Scanning Calorimetry (DSC) is described as follows. Preferably, about 6 mg to about 10 mg of a sheet of the polymer pressed at approximately 200° C. to 230° C. is removed with a punch die and is annealed at room temperature for 48 hours. At the end of this period, the sample is placed in a Differential Scanning Calorimeter (TA Instruments, Model 2920) and cooled to about −50° C. The sample is then heated at about 1° C./min to about 200° C. The thermal output is recorded as the area under the melting peak of the sample which is typically at a maximum peak at about 30° C. to about 175° C. and occurs between the temperatures of about 0° C. and about 200° C. The thermal output is measured in Joules as a measure of the heat of fusion. The melting point is recorded as the peak temperature in the melting peak.

I. Molecular Weight and Molecular Weight Distribution

Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight, Mz/Mw.

Mw and Mn are generally measured by GPC (Gel Permeation Chromatography) using a differential refractive index (DRI) detector. This method preferably uses a Waters 150C C GPC gel permeation chromatograph equipped with a Waters differential refractometer that measures the difference between the refractive index of the solvent and that of the solvent containing the fractionated polymer. The system is preferably used at 145° C. with 1,2,4-trichlorobenzene (TCB) as the mobile phase and stabilized with ~250 ppm of butylated hydroxy toluene (BHT). The flow rate is preferably 0.5 mL/min. Three PLgel Mixed-B columns Polymer Laboratories) are also preferably used in this measurement. This technique is discussed in "*Macromolecules*", Vol. 34, No. 19, pp. 6812-6820, which is incorporated herein by reference.

The separation efficiency of the column set can be calibrated using a series of narrow MWD polystyrene standards, which reflects the expected MW range for samples and the exclusion limits of the column set. At least 10 individual polystyrene standards, ranging from Mp ~580 to 10,000,000, are preferably used to generate the calibration curve. The polystyrene standards can be readily obtained from known sources such as Polymer Laboratories (Amherst, Mass.) or an equivalent source. To assure internal consistency, the flow rate is preferably corrected for each calibrant run to give a common peak position for the flow rate marker (taken to be the positive inject peak) before determining the retention volume for each polystyrene standard. The flow marker peak position is preferably used to correct the flow rate when analyzing samples. A calibration curve (logMp vs. retention volume) can be generated by recording the retention volume at the peak in the DRI signal for each PS standard, and fitting this data set to a 2 order polynomial. Polystyrene standards were graphed using Viscotec 3.0 software. Samples can be analyzed using WaveMetrics, Inc. IGOR Pro and Viscotec 3.0 software using updated calibration constants. The columns are preferably calibrated using sixteen polystyrene standards of known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975), pp. 287-368; Rodriguez, F., *Principles of Polymer Systems 3rd ed.*, Hemisphere Pub. Corp., NY, (1989), pp. 155-160; U.S. Pat. No. 4,540,753; Verstrate et al., *Macromolecules*, vol. 21, (1988), p. 3360; and references cited therein.

In one embodiment of the invention, the polymer that is produced according to the invention has a weight average molecular weight (Mw) of from 5,000 to 5,000,000, or from 20,000 to 1,000,000. In another embodiment of the invention, the polymer has a molecular weight distribution (MWD), which is defined as a ratio of weight average molecular weight to number average molecular weight (MWD=$M_w/M_n$), of greater than 0.5, preferably from 0.5 to about 20. In some embodiments, the polymer has a $M_w/M_n$ of at least 1, preferably from about 1 to 15, while in other embodiments the polymer produced has a $M_w/M_n$ of at least 1.5, preferably from about 1.5 to 10. Preferably, the polymer of the invention has a narrow molecular weight distribution J. Tacticity The tacticity index, expressed herein as "m/r", is determined by $^{13}C$ nuclear magnetic resonance (NMR). The tacticity index m/r is calculated as defined in H. N. Cheng, *Macromolecules*, 17, p. 1950, (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50. Various embodiments of the invention preferably have a tacticity index m/r ranging from a lower limit of 4 or 6 to an upper limit of 8 or 10 or 12.

An ancillary procedure for the description of the tacticity of the propylene units is the use of triad tacticity. The triad tacticity of a polymer is the relative tacticity of a sequence of three adjacent propylene units, a chain consisting of head to tail bonds, expressed as a binary combination of m and r sequences. It is usually expressed as the ratio of the number of units of the specified tacticity to all of the propylene triads in the copolymer.

The triad tacticity (mm fraction) of a propylene polymer can be determined from a $^{13}C$ NMR spectrum and the following formula:

$$\text{mm Fraction} = \frac{PPP(\text{mm})}{PPP(\text{mm}) + PPP(\text{mr}) + PPP(\text{rr})}$$

where PPP(mm), PPP(mr) and PPP(rr) denote peak areas derived from the methyl groups of the second units in the following three propylene unit chains consisting of head-to-tail bonds:

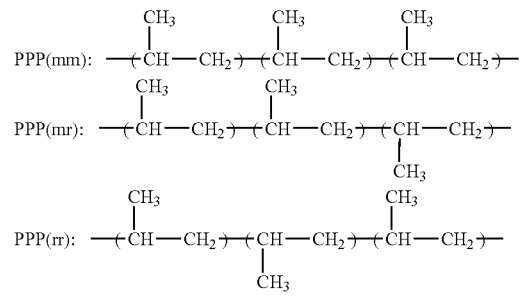

The $^{13}C$ NMR spectrum of the propylene polymer is measured as described in U.S. Pat. No. 5,504,172. The spectrum relating to the methyl carbon region [19-23 parts per million (ppm)] can be divided into a first region (21.2-21.9 ppm), a second region (20.3-21.0 ppm) and a third region (19.5-20.3 ppm). Each peak in the spectrum was assigned with reference to an article in the journal *Polymer*, Volume 30, (1989), p. 1350.

In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene unit resonates (in the vicinity of 19.8 ppm).

The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene unit-chains [PPP(mr) and PPP(rr)] consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

In one embodiment of the invention, the polymers have a triad tacticity of three propylene units, as measured by $^{13}C$ NMR, of greater than 75%, or greater than 80%, or greater than 82%, or greater than 85%, or greater than 90%.

The insertion of propylene can occur to a small extent by either 2,1 (tail to tail) or 1,3 insertions (end to end). Examples of 2,1 insertion are shown in structures 1 and 2 below.

Proportion of inversely inserted unit based on 2,

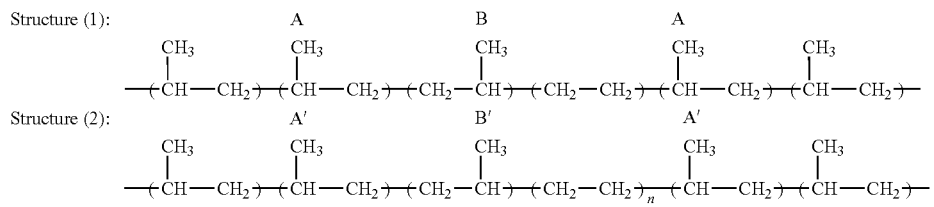

Naming of the peaks in the above formula was made in accordance with a method by Carman, et al. in the journal *Rubber Chemistry and Technology*, volume 44 (1971), p. 781, Structure (1):

$$\begin{array}{ccccc} & A & B & & A \\ CH_3 & CH_3 & CH_3 & CH_3 & CH_3 \\ | & | & | & | & | \\ -\!\!\!+\!CH-CH_2\!\!\!+\!\!\!+\!CH-CH_2\!\!\!+\!\!\!+\!CH_2-CH\!\!\!+\!\!\!+\!CH_2-CH_2\!\!\!+\!\!\!+\!CH-CH_2\!\!\!+\!\!\!+\!CH-CH_2\!\!\!+\!\!\!- \end{array}$$

Structure (2):

$$\begin{array}{ccccc} & A' & B' & & A' \\ CH_3 & CH_3 & CH_3 & CH_3 & CH_3 \\ | & | & | & | & | \\ -\!\!\!+\!CH-CH_2\!\!\!+\!\!\!+\!CH-CH_2\!\!\!+\!\!\!+\!CH_2-CH\!\!\!+\!\!\!+\!CH_2-CH_2\!\!\!+\!\!\!_n\!\!\!+\!CH-CH_2\!\!\!+\!\!\!+\!CH-CH_2\!\!\!+\!\!\!- \end{array}$$

where $n \geq 2$.

A peak of the carbon A and a peak of the carbon A' appear in the second region. A peak of the carbon B and a peak of the carbon B' appear in the third region, as described above. Among the peaks which appear in the first to third regions, peaks which are not based on the 3 propylene unit chain consisting of head-to-tail bonds are peaks based on the PPE-methyl group, the EPE-methyl group, the carbon A, the carbon A', the carbon B, and the carbon B'.

The peak area based on the PPE-methyl group can be evaluated by the peak area of the PPE-methine group (resonance in the vicinity of 30.8 ppm), and the peak area based on the EPE-methyl group can be evaluated by the peak area of the EPE-methine group (resonance in the vicinity of 33.1 ppm). The peak area based on the carbon A can be evaluated by twice as much as the peak area of the methine carbon (resonance in the vicinity of 33.9 ppm) to which the methyl group of the carbon B is directly bonded; and the peak area based on the carbon A' can be evaluated by the peak area of the adjacent methine carbon (resonance in the vicinity of 33.6 ppm) of the methyl group of the carbon B'. The peak area based on the carbon B can be evaluated by the peak area of the adjacent methine carbon (resonance in the vicinity of 33.9 ppm); and the peak area based on the carbon B' can be also evaluated by the adjacent methine carbon (resonance in the vicinity of 33.6 ppm).

By subtracting these peak areas from the total peak areas of the second region and the third region, the peak areas based on the three propylene unit chains [PPP(mr) and PPP(rr)] consisting of head-to-tail bonds can be obtained. Thus, the peak areas of PPP(mm), PPP(mr) and PPP(rr) can be evaluated, and the triad tacticity of the propylene unit chain consisting of head-to-tail bonds can be determined.

The proportion of the 2,1-insertions to all of the propylene insertions in a propylene elastomer can be calculated by the following formula with reference to article in the journal *Polymer*, vol. 30 (1989), p. 1350.

where $I_{\alpha\delta}$ denotes a peak area of the $\alpha\delta^+$ secondary carbon peak. It is difficult to separate the peak area of $I\alpha\beta$ [structure (i)] from $I\alpha\beta$ [structure (ii)] because of overlapping of the peaks. Carbon peaks having the corresponding areas can be substituted therefor.

The measurement of the 1,3 insertion requires the measurement of the βγ peak. Two structures can contribute to the βγ peak: (1) a 1,3 insertion of a propylene monomer; and (2) from a 2,1-insertion of a propylene monomer followed by two ethylene monomers. This peak is described as the 1.3 insertion peak, and the procedure described in U.S. Pat. No. 5,504, 172 can be used, which describes this βγ peak, and which is understood to represent a sequence of four methylene units. The proportion (%) of the amount of these errors was determined by dividing the area of the βγ peak (resonance in the vicinity of 27.4 ppm) by the sum of all the methyl group peaks and ½ of the area of the βγ peak, and then multiplying the resulting value by 100. If an α-olefin of three or more carbon atoms is polymerized using an olefin polymerization catalyst, a number of inversely inserted monomer units are present in the molecules of the resultant olefin polymer. In polyolefins prepared by polymerization of α-olefins of three or more carbon atoms in the presence of a chiral bulky ligand metallocene-type catalyst, 2,1-insertion or 1,3-insertion takes place in addition to the usual 1,2-insertion, such that inversely inserted units such as a 2,1-insertion or a 1,3-insertion are formed in the olefin polymer molecule [see, *Macromolecular Chemistry Rapid Communication*, Volume 8, p. 305 (1987), by K. Soga, T. Shiono, S. Takemura and W. Kaminsid].

In one embodiment of the invention, the proportion of inversely inserted propylene units, based on the 2,1-insertion of a propylene monomer in all propylene insertions, as measured by $^{13}C$ NMR, is greater than 0.5%, or greater than 0.6%.

In one embodiment of the invention, the proportion of inversely inserted propylene units, based on the 1,3-insertion of a propylene monomer, as measured by $^{13}C$ NMR, is greater than 0.05%, or greater than 0.06%, or greater than 0.07%, or greater than 0.08%, or greater than 0.085 percent.

J. Intermolecular Distribution of Tacticity

Various embodiments of the invention preferably have a statistically insignificant intermolecular difference of tacticity of polymerized propylene between different chains (intermolecularly). This can be determined by thermal fractionation by controlled dissolution generally in a single solvent, at a series of slowly elevated temperatures. These controlled dissolution procedures are commonly used to separate similar polymers of different crystallinity due to differences in isotactic propylene sequences, as shown in the article in "*Macromolecules*", Vol. 26, p. 2064 (1993).

In one embodiment, at least 75% by weight, or at least 80% by weight, or at least 85% by weight, or at least 90% by weight, or at least 95% by weight, or at least 97% by weight, or at least 99% by weight of the polymer is soluble in a single temperature fraction, or in two adjacent temperature fractions, with the balance of the polymer in immediately preceding or succeeding temperature fractions. These percentages are fractions, beginning at 23° C. and the subsequent fractions are in approximately 8° C. increments above 23° C. Meeting such a fractionation requirement means that a polymer has statistically insignificant intermolecular differences of tacticity of the polymerized propylene.

K. Intermolecular Distribution of Composition

Various propylene-ethylene copolymer embodiments of the invention have statistically insignificant intermolecular differences of composition, which is the ratio of propylene to ethylene between different chains (intermolecular). This compositional analysis is by infrared spectroscopy of the fractions of the polymer obtained by the controlled thermal dissolution procedure described above.

A measure of the statistically insignificant intermolecular differences of composition, each of these fractions has a composition (wt. % ethylene content) with a difference of less than 1.5 wt. % (absolute) or less than 1.0 wt. % (absolute), or less than 0.8 wt. % (absolute) of the average wt. % ethylene content of the whole copolymer. Meeting such a fractionation requirement means that a polymer has statistically insignificant intermolecular differences of composition, which is the ratio of propylene to ethylene.

L. Polymer Blends

The polymers of the invention may be blended and/or coextruded with any other polymer. Non-limiting examples of other polymers that can be blended with the polypropylene polymer of this invention include linear low density polyethylenes produced via conventional ligand metallocene and/or bulky Ziegler-Natta catalysis, elastomers, plastomers, high pressure low density polyethylene, various high density polyethylenes, various other polypropylenes and the like.

M. Articles

Polymers produced by the process of the invention and blends thereof are useful in producing any variety of articles. For example, the polymers are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

The films may be formed by any of the conventional techniques known in the art including extrusion, co-extrusion, lamination, blowing and casting. The film may be obtained by the flat film or tubular process which may be followed by orientation in a uniaxial direction or in two mutually perpendicular directions in the plane of the film to the same or different extents. Orientation may be to the same extent in both directions or may be to different extents. Particularly preferred methods to form the polymers into films include extrusion or coextrusion on a blown or cast film line.

In another embodiment, the polymer of the invention is made into a film by methods known in the art. For film applications, the polymers of the invention have an $I_{21}$ value of from about 2 to about 100 dg/min, preferably from about 2 to about 50 dg/min, and more preferably from about 2 to about 30 dg/min. $I_{21}$ is measured by ASTM Method D 1238.

In another embodiment, the polymer of the invention is made into a molded article by methods known in the art, for example, by blow molding and injection-stretch molding. For molded applications, the polymers of the invention have a $I_{21}$ of from about 20 dg/min to about 50 dg/min and preferably from about 35 dg/min to about 45 dg/min.

In another embodiment, the polymer of the invention is made into a pipe by methods known in the art. For pipe applications, the polymers of the invention have a $I_{21}$ of from about 2 to about 10 dg/min and preferably from about 2 to about 8 dg/min. In another embodiment, the pipe of the invention satisfies ISO qualifications. In another embodiment, the present invention is used to make polyethylene pipe having a predicted S-4 $T_c$ for 110 mm pipe of less than −5° C., preferably of less than −15° C. and more preferably less than −40° C. (ISO DIS 13477/ASTM F1589).

In another embodiment, the polymer has an extrusion rate of greater than about 17 lbs/hour/inch of die circumference and preferably greater than about 20 lbs/hour/inch of die circumference and more preferably greater than about 22 lbs/hour/inch of die circumference.

The objects produced (such as films, pipes, etc.) may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, $BaSO_4$, diatomaceous earth, wax, carbon black, flame retarding additives, low molecular weight resins, hydrocarbon resins, glass beads and the like. The additives may be present in the typically effective amounts well known in the art, such as 0.001 weight % to 10 weight %.

The polymers of the invention may be blended and/or co-extruded with any other polymer. Non-limiting examples of other polymers include linear low density polyethylenes produced via conventional Ziegler-Natta and/or bulky ligand metallocene-type catalysis, elastomers, plastomers, high pressure low density polyethylene, high density polyethylenes, and the like. and Sons, New York, 1999. A value of 189 J/g (B) was used as the heat of fusion for 100% crystalline polypropylene. For polymers displaying multiple melting and/or multiple crystallization peaks, all the peak crystallization temperatures and peak melting temperatures were reported. The heat of fusion for each melting peak was calculated individually. The glass transition temperature (Tg) was measured by ASTM E 1356 using a TA Instruments model 2920 machine.

Ethylene content of the polymers was determined using $^{13}C$ nuclear magnetic resonance (NMR). All the peaks in the NMR spectra were referenced by setting the mmmm methyl peak to 21.8 ppm. All secondary carbons are defined by the peak regions in Table A. Naming of the peaks was made in accordance with a method by Carman, et al. in *Rubber Chemistry and Technology*, 44 (1971), p. 781, where e.g., $S_{\alpha\delta}$ denotes a peak area of the $\alpha\delta^+$ secondary carbon peak.

TABLE A

| ppm range | assignment |
|---|---|
| 45-48 | $S_{\alpha\alpha}$ |
| 36-39 | $S_{\alpha\delta} + S_{\alpha\gamma}$ |
| 34-36 | $S_{\alpha\beta}$ |
| 30.7 | $S_{\gamma\gamma}$ |
| 30.3 | $S_{\gamma\delta}$ |
| 29.9 | $S_{\delta\delta}$ |
| 27.5-27.7 | $S_{\beta\gamma}$ |
| 27.1-27.3 | $S_{\beta\delta}$ |
| 24.5-25 | $S_{\beta\beta}$ |

All tertiary carbons are defined by the peak regions in Table B. Note that the peak region of 30.7-31 ppm has overlapping peaks of secondary and tertiary carbons.

TABLE B

| ppm range | assignment |
|---|---|
| 33.6-34 | $T_{\gamma\gamma}$ |
| 33.4-33.6 | $T_{\gamma\delta}$ |
| 33.2 | $T_{\delta\delta}$ |
| 31-31.4 | $T_{\beta\gamma}$ |
| 30.7-31 | $(T_{\beta\delta} + S_{\gamma\gamma})$ |
| 28-29 | $T_{\beta\beta}$ |

The $T_{\beta\delta}$ and $S_{\gamma\gamma}$ peaks are overlapping. The area of $S_{\gamma\gamma}$ peak can be calculated as:

$$S_{\gamma\gamma}=(S_{\beta\delta}-S_{\gamma\delta})/2 \quad (A)$$

In Table A, the area of $S_{\gamma\gamma}$ peak was calculated by equation A, rather than by direct integration. Total area of secondary carbons (S) was calculated by the sum of all areas in Table A. Total area of tertiary carbons (T) was calculated by the sum of all areas in Table B subtracted by the area of $S_{\gamma\gamma}$ peak, as calculated by equation (A).

Total area of primary carbons (P) is the total area between 19 and 23 ppm.

Ethylene content, in weight %, was calculated by $$E \text{ wt }\%=(S-T/2-P/2)/(S+T+P) \quad (B)$$

EXAMPLES 1-5

Examples 1-5 were performed in a 2.0-liter autoclave reactor equipped with a stirrer, an external water/steam jacket for temperature control, a regulated supply of dry nitrogen, ethylene, propylene, and a septum inlet for introduction of other solvents, catalysts and scavenger solutions. The reactor was dried and degassed thoroughly prior to use. Diluent and monomers were purified by passing through a series of columns consisting of molecular sieves (3A and 13X) activated at 600° C. and Selexsorb CD prior to transferring into the reactor. The reactor was dried and degassed thoroughly prior to use. Triethyl aluminum solution (TEAL) (1 mol % in hexane) and hydrogen, when present, were first added into the reactor. Then fluorocarbon and propylene were added into the reactor, and the mixture was then immediately stirred and heated rapidly to a desired polymerization temperature and equilibrated. An additional amount of propylene was then used to add the catalyst-oil slurry to the reactor. The polymerization was conducted for 60 minutes at 70° C. Thereafter, the reactor was cooled down and unreacted propylene and diluent were vented to the atmosphere. The resulting mixture, containing mostly diluent, polymer and unreacted monomer, was collected in a collection box and first air-dried in a hood to evaporate most of the diluent, and then dried in a vacuum oven at a temperature of about 90° C. for about 12 hours.

The catalyst system included a bulky ligand metallocene-type catalyst on a fluorided ("F") silica support, and a non-coordinating anion ("NCA") activator, such as described in U.S. Pat. No. 6,143,686. The catalyst system was prepared as described in U.S. Pat. No. 6,143,686: trisperfluorophenylboron in toluene (Albemarle Corporation, Baton Rouge, La.) and N,N-diethyl aniline were combined and then mixed with fluorided silica. Rac-dimethylsilanedyl-bis(2-methyl-4-phenylindenyl)zirconium dimethyl was added. The fluorided silica is described in WO 00/12565.

Generally, to prepare the fluorided silica, $SiO_2$ (Grace Davison, a subsidiary of W. R. Grace Co., Conn.) as Sylopol® 952 ("952 silica gel") having a $N_2$ pore volume 1.63 cc/gm and a surface area of 312 $m_2$/gm, was dry mixed with 0.5 to 3 grains of ammonium hexafluorosilicate (Aldrich Chemical Company, Milwaukee, Wis.). The amount of ammonium hexafluorosilicate added corresponds to 1.05 millimole F per gram of silica gel. The mixture was transferred to a furnace and a stream of $N_2$ was passed up through the grit to fluidize the silica bed. The furnace was heated according to the following schedule:

Raise the temperature from 25 to 150° C. over 5 hours;

These polymer products are also characterized as having at least 10 ppm of residual fluorine present, preferably between 10 and 10,000 ppm of fluorine present, preferably between 10 and 1000 ppm.

VII. EXAMPLES

Test Methods

Molecular weight (Mw, Mn, and Mz) and molecular weight distribution (Mw/Mn) distribution of the polymers were determined using gel permeation chromatography (GPC) on a Water 150C high temperature chromatographic unit equipped with a DRI detector and four linear mixed bed columns (Polymer Laboratories PLgel Mixed-B LS, 20-micron particle size). The oven temperature was at 160° C. with the auto sampler hot zone at 160° C. and the warm zone at 145° C. About 0.2 weight % of polymer sample was dissolved in 1,2,4-trichlorobenzene containing 200 ppm 2,6-di-t-butyl-4-methylphenol. The flow rate was 1.0 milliliter/minute and the injection size is 100 microliters.

Peak melting point (Tm), peak crystallization temperature (Tc), heat of fusion and crystallinity were determined using the following procedure according to ASTM E 794-85. Differential scanning calorimetric (DSC) data was obtained using a TA Instruments model 2920 machine. Samples weighing approximately 7-10 mg were sealed in aluminum sample pans. The DSC data was recorded by first cooling the sample to −50° C. and then gradually heating it to 200° C. at a rate of 10° C./minute. The sample was kept at 200° C. for 5 minutes before a second cooling-heating cycle was applied. Both the first and second cycle thermal events were recorded.

Areas under the melting curves were measured and used to determine the heat of fusion and the degree of crystallinity. The percent crystallinity was calculated using the formula, [area under the curve (Joules/gram)/B (Joules/gram)]*100, where B is the heat of fusion for the homopolymer of the major monomer component. These values for B were obtained from the *Polymer Handbook*, Fourth Edition, published by John Wiley Hold the temperature at 150° C. for 4 hours;
Raise the temperature from 150 to 500° C. over 2 hours;
Hold the temperature at 500° C. for 4 hours;
Turn heat off and allow to cool under $N_2$;
When cool, the fluorided silica was stored under $N_2$.

A sufficient amount of the catalyst system was provided to ensure adequate charge for the polymerization runs. The catalyst system was suspended in oil slurry for ease of addition to the reactor. Drakeol™ mineral oil (Penreco, Dickinson, Tex.) was used.

BFC-245fa, 1,1,1,3,3-pentafluoropropane, which was used as the diluent in Examples 2-5, was obtained from Honeywell (Enovate 3000). No diluent was used in Example 1.

Examples 1-5 refer to homopolymers of propylene on supported bulky ligand metallocene-type catalyst. All of the polymers produced in Examples 1-5 were in discrete granular form. By discrete granular form is meant that there was no significant granule agglomeration in the polymerization medium. The polymer granules formed are not soluble or swellable to any significant extent in the polymerization media. The results are shown in Table 1.

TABLE 1

| Process Condition | Product Characteristic | | | | |
|---|---|---|---|---|---|
| | Ex 1 | Ex 2 | Ex 3 | Ex 4 | Ex 5 |
| Catalyst amount (mg) | 107.8 | 113.8 | 107.8 | 107.8 | 107.8 |
| Propylene (ml) | 1250 | 750 | 750 | 750 | 750 |
| $H_2$ (mmole) | 0 | 0 | 2.8 | 5.6 | 8.4 |
| TEAL (1M in hexane)(ml) | 0.5 | 0.5 | 0.5 | 0.5 | 0.5 |
| HFC-245fa (ml) | 0 | 500 | 500 | 500 | 500 |
| Yield (g) | 33.3 | 9.3 | 17.2 | 14.6 | 26.8 |
| Conversion (%) | 5.1 | 2.4 | 4.4 | 3.7 | 6.9 |
| Productivity (kg poly/g cat/Hr) | 0.31 | 0.08 | 0.16 | 0.13 | 0.24 |
| Mn (kg/mol) | 278.4 | 202.7 | 54.7 | 29.5 | na |
| Mw (kg/mol) | 621.0 | 494.3 | 186.3 | 107.8 | na |
| Mz (kg/mol) | 1106.1 | 905.1 | 376.2 | 238.5 | na |
| MWD (Mw/Mn) | 2.23 | 2.44 | 3.40 | 3.65 | na |
| Tc (° C.) | 107.45 | 107.2 | 108.9 | 109.4 | 110.2 |
| Tm (° C.) | 152.69 | 151.1 | 152.5 | 151.6 | 147.8 |
| Heat of fusion (J/g) | 95.74 | 83.8 | 85.5 | 93 | 97.1 |
| % Crystallinity | 50.7 | 44.3 | 45.2 | 49.2 | 51.4 |

The data of Table 1 show that polypropylene homopolymers made using fluorinated hydrocarbon as a diluent were formed as discrete particles, with increasing productivity and decreasing molecular weight with increasing addition of hydrogen.

EXAMPLES 6-7

Examples 6-7 are examples of homopolymers of propylene made using unsupported bulky ligand metallocene-type catalyst. These examples were carried out as in Examples 1-5 except that (1) a 0.5 liter reactor was used; (2) an unsupported bulky ligand metallocene-type catalyst (rac-dimethylsilylbis (2-methyl-4-phenylindenyl) zirconium dimethyl) was used, and the polymerization was conducted in a 0.5-liter autoclave reactor. The catalyst was preactivated with N,N-dimethylanilinium tetrakis(pentafluorophenyl)borate (obtained from Albemarle) at a molar ratio of 1:1 to 1:1.2 in about 50 ml of toluene at least 10 minutes prior to the polymerization reaction. About 2 ml of the catalyst stock solution was injected into the reactor. A catalyst solution was prepared and kept in an inert atmosphere at <1.5 ppm water. HFC-236fa is 1,1,1, 3,3,3-hexafluoropropane, and was obtained from Dupont (SUVA-236fa). Table 2 lists the detailed polymerization conditions.

TABLE 2

| Process Condition | Product Characteristic | |
|---|---|---|
| | Ex 1 | Ex 2 |
| Catalyst amount (mg) | 2 | 3.1 |
| Propylene (ml) | 125 | 125 |
| Solvent | Hexane | HFC-236fa |
| Solvent (ml) | 125 | 125 |
| Yield (g) | 39.8 | 58.5 |
| Reaction time (min) | 15 | 30 |
| Conversion (%) | 62.6 | 91.9 |
| Productivity (kg poly/g cat/Hr) | 79.6 | 37.7 |
| Tc (° C.) | 103.8 | 104.9 |
| Tm (° C.) | 155.1 | 141.4 |
| Heat of fusion (J/g) | 103.2 | 92.6 |
| % Crystallinity | 54.6 | 49.0 |

The above table shows that an unsupported catalyst was very active in the presence of HFC. The calculated productivity is lower in the case of HFC, a result of lower final propylene concentration due to the batch polymerization and the higher propylene conversion.

Examples 8-14

Examples 8-14 are examples of propylene-ethylene copolymers made using HFC-245fa and a supported bulky ligand metallocene-type catalyst. The catalyst and procedure are as that described in Examples 1-5 with the following exception: (1) a 0.5-liter reactor was used; (2) triethyl aluminum (TEAL) (1 mol % in hexane) solution was first added into the reactor. Then the catalyst slurry was cannulated into the reactor using nitrogen. In succession, fluorocarbon and propylene were added into the reactor at room temperature. The mixture was then stirred and rapidly heated to 70° C. Ethylene was then added into the reactor. The amount of ethylene addition was controlled to maintain the differential pressure in the excess of combined vapor pressure of the propylene and solvent by setting the inlet pressure of ethylene feed line at a desired level higher than the registered reactor pressure prior to ethylene addition. Detailed conditions are listed in Table 3.

TABLE 3

| Process Condition | Product Characteristic | | | | | | |
|---|---|---|---|---|---|---|---|
| | Ex 8 | Ex 9 | Ex 10 | Ex 11 | Ex 12 | Ex 13 | Ex 14 |
| Catalyst amount (mg) | 120.2 | 122.6 | 126.4 | 124 | 130.2 | 120.2 | 136.4 |
| HFC-245fa (ml) | 100 | 100 | 100 | 100 | 100 | 100 | 100 |
| Propylene (ml) | 125 | 125 | 125 | 125 | 125 | 125 | 125 |
| Ethylene (psid) | 2 | 5 | 25 | 30 | 35 | 40 | 50 |
| Yield (g) | 14 | 26.6 | 35.2 | 20.5 | 43.6 | 33.3 | 22.1 |
| Productivity (kg poly/g cat Hr) | 0.12 | 0.22 | 0.29 | 0.17 | 0.33 | 0.28 | 0.16 |
| Free flowing granule (%) | 100 | 100 | 60 | 85 | 4 | 2 | 0 |
| Mn (kg/mol) | 13.0 | ** | 14.9 | 13.4 | 11.7 | 15.0 | 10.5 |
| Mw (kg/mol) | 105.1 | ** | 92.6 | 94.2 | 86.0 | 93.9 | 75.7 |
| Mz (kg/mol) | 220.3 | ** | 199.7 | 192.8 | 184.8 | 194.9 | 158.6 |
| MWD (Mw/Mn) | 8.1 | ** | 6.2 | 7.0 | 7.4 | 6.3 | 7.2 |
| Ethylene content (weight %) | 6.2 | ** | 10.8 | 8.7 | 14.5 | 12.6 | 13.6 |
| Tc (° C.) | 86.5 | 88.1 | 83.9 | 79.3 | 76.3 | 75.0 | 78.3 |
| Tm (° C.) | 129.4 | 131.4 | 124.7 | 121.2 | 118.9 | 116.5 | 119.5 |
| Heat of fusion (J/g) | 46.7 | 53.8 | 37.5 | 45.4 | 27.1 | 26.3 | 23.7 |
| Crystallinity (%) | 24.7 | 28.5 | 19.8 | 24.0 | 14.4 | 13.9 | 12.5 |

**Data not available at the time of filing

Examples 8 to 14 displayed a wide melting peak and a wide crystallization peak on the DSC traces. Examples 8 and 9 had 100% of free flowing granules, and Example 4 had about 85% of free flowing granule. Free flowing granule is defined as discrete granule of polymer resin produced in reactor without any agglomeration after solvent removal and the granules can flow through a 60° funnel with a half-inch opening under gravitational force. Compared to the polymers made in the comparative diluent (discussed below) the above polymer granules are more free flowing at comparable ethylene content.

EXAMPLES 15-21

Examples 15-21 are comparative examples of propylene-ethylene copolymers produced using hexane as solvent and a supported bulky ligand metallocene-type catalyst. These examples were carried out as in Examples 8-14, except that Examples 15 and 16 were carried out in bulk propylene and Examples 17 to 21 were made using hexane as diluent. Detailed conditions are listed in Table 4.

TABLE 4

| Process Condition | Product Characteristic | | | | | | |
|---|---|---|---|---|---|---|---|
| | Ex 15 | Ex 16 | Ex 17 | Ex 18 | Ex 19 | Ex 20 | Ex 21 |
| Reaction temperature (° C.) | 68 | 61 | 70 | 70 | 70 | 70 | 70 |
| Catalyst amount (mg) | 134 | 127 | 125.8 | 129 | 126.4 | 123.4 | 126 |
| Diluent | na | na | Hexane | Hexane | Hexane | Hexane | Hexane |
| HFC-245fa (ml) | na | na | 100 | 100 | 100 | 100 | 100 |
| Propylene (ml) | 150 | 250 | 125 | 125 | 125 | 125 | 125 |
| Ethylene (psid) | 2 | 35 | 2 | 5 | 30 | 40 | 50 |
| Yield (g) | 14.8 | 36.8 | 30.9 | 26.2 | 33.9 | 38.1 | 47.1 |
| Productivity (kg poly/g cat H) | 0.11 | 0.29 | 0.25 | 0.20 | 0.27 | 0.31 | 0.37 |
| Free flowing granule (%) | 100 | 100 | 0 | 0 | 0 | 0 | 0 |
| Mn (kg/mol) | ** | ** | 24.4 | 19.7 | 28.7 | 16.6 | 25.0 |
| Mw (kg/mol) | ** | ** | 189.8 | 189.8 | 154.1 | 120.4 | 122.9 |
| Mz (kg/mol) | ** | ** | 421.1 | 416.7 | 309.6 | 250.2 | 272.6 |
| MWD (Mw/Mn) | ** | ** | 7.8 | 9.6 | 5.4 | 7.3 | 4.9 |
| Ethylene content (weight %) | ** | ** | 6.2 | 5.4 | 9.1 | 12.0 | 11.0 |
| Tc (° C.) | 104.9 | 95.9 | 92.7 | 91.7 | 74.3 | 62.2 | 62.1 |
| Tm (° C.) | 150.8 | 137.1 | 134.6 | 132.0 | 121.0 | 110.4 | 106.2 |
| Heat of fusion (J/g) | 85.7 | 79.4 | 60.1 | 60.4 | 44.3 | 31.7 | 34.6 |
| Crystallinity (%) | 45.4 | 42.0 | 31.8 | 31.9 | 23.4 | 16.8 | 18.3 |

The polymers produced in Examples 17 to 21 were in sticky blob form, and did not produce discrete particles.

Having now fully described this invention, it will be appreciated by those skilled in the art that the invention can be performed within a wide range of parameters within what is claimed, without departing from the spirit and scope of the invention.

All documents described or listed herein are incorporated by reference, including any priority documents and/or testing procedures, to the extent that they are not inconsistent with the disclosure.

We claim:

1. A process for producing polymer, comprising:
   mixing together a diluent containing more than 10 weight percent of a fluorinated hydrocarbon based on the total weight of the diluent, a bulky ligand metallocene-type catalyst system, and an olefin feed containing propylene and optionally one or more comonomers; and forming a polymer wherein the fluorinated hydrocarbon in the diluent is not a perfluorinated hydrocarbon, wherein the bulky ligand metallocene-type catalyst system comprises an activator and a bulky ligand metallocene-type compound is represented by the formula:

$$L^A L^B MQ_n \text{ (I) or } L^A AL^B MQ_n \text{ (II)}$$

where M is a metal from Group 3 to 12 of the Periodic Table of Elements, $L^A$ and $L^B$ are selected from the group consisting of cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, pyrrolyl ligands, pyrozolyl ligands, carbazolyl ligands, borabenzene ligands and hydrogenated versions thereof;

Q is a monoanionic labile ligand having a sigma-bond to M, and depending on the oxidation state of M, the value for n is 0, 1 or 2 such that Formula I or II above represents a neutral bulky ligand metallocene-type catalyst compound; and A is a bridging group containing carbon, germanium or silicon.

2. The process of claim 1, wherein the diluent contains greater than 5 volume percent of a fluorinated hydrocarbon based on the total volume of the diluent.

3. The process of claim 1, wherein the olefin feed contains at least 92 weight % propylene, based on total weight of the olefin feed.

4. The process of claim 3, wherein the olefin feed contains at least 94 weight % propylene, based on total weight of the olefin feed.

5. The process of claim 4, wherein the olefin feed contains at least 96 weight % propylene, based on total weight of the olefin feed.

6. The process of claim 5, wherein the olefin feed contains at least 98 weight % propylene, based on total weight of the olefin feed.

7. The process of claim 1, wherein the fluorinated hydrocarbon is represented by the formula: $C_x H_y F_z$, wherein x is an integer from 1 to 40, wherein y is greater than or equal to 0 and z is an integer and at least one.

8. The process of claim 7, wherein x is from 1 to 6, and y and z are integers and at least one.

9. The process of claim 1, wherein the diluent further comprises at least one $C_1$ to $C_{40}$ alkane, preferably at least one $C_1$ to $C_{20}$ alkane, or more preferably at least one $C_1$ to $C_8$ alkane.

10. The process of claim 1, wherein the diluent comprises a mixture of at least one saturated hydrocarbon and at least one fluorinated hydrocarbon wherein the mixture has a density in the range of from 0.2 g/cc less than to 0.2 g/cc greater than the density of the polymer.

11. The process of claim 9, wherein the diluent comprises a mixture of at least one saturated hydrocarbon and at least one fluorinated hydrocarbon wherein the mixture has a density in the range of from 0.1 g/cc less than to 0.1 g/cc greater than the density of the polymer.

12. The process of claim 11, wherein the diluent comprises a mixture of at least one saturated hydrocarbon and at least one fluorinated hydrocarbon wherein the mixture has a density in the range of from 0.05 g/cc less than to 0.05 g/cc greater than the density of the polymer.

13. The process of claim 1, wherein the fluorinated hydrocarbon is present in the diluent at greater than 15 weight %, based on the total weight of the diluent.

14. The process of claim 13, wherein the fluorinated hydrocarbon is present in the diluent at greater than 20 weight %, based on the total weight of the diluent.

15. The process of claim 14, wherein the fluorinated hydrocarbon is present in the diluent at greater than 25 weight %, based on the total weight of the diluent.

16. The process of claim 15, wherein the fluorinated hydrocarbon is present in the diluent at greater than 30 weight %, based on the total weight of the diluent.

17. The process of claim 1, wherein the polymer has a melting temperature of greater than or equal to 75° C.

18. The process of claim 17, wherein the polymer has a melting temperature of greater than or equal to 95° C.

19. The process of claim 18, wherein the polymer has a melting temperature of greater than or equal to 100° C.

20. The process of claim 1, wherein the polymer has a heat of fusion not greater than 100 J/g.

21. The process of claim 20, wherein the polymer has a heat of fusion not greater than 80 J/g.

22. The process of claim 21, wherein the polymer has a heat of fusion not greater than 60 J/g.

23. The process of claim 22, wherein the polymer has a heat of fusion not greater than 50 J/g.

24. The process of claim 1, wherein the polymer has a crystallinity greater than or equal to 10%.

25. The process of claim 22, wherein the polymer has a crystallinity greater than or equal to 200%.

26. The process of claim 1, wherein the polymer has a crystallinity not greater than 25%.

27. The process of claim 1, wherein the polymer has a crystallinity not greater than 20%.

28. The process of claim 1, wherein the polymer has a crystallinity not greater than 15%.

29. The process of claim 1, wherein the olefin feed further contains one or more comonomers having olefinic unsaturation.

30. The process of claim 1, wherein the olefin feed further contains one or more comonomers selected from linear, branched, or ring-containing olefins having up to 30 carbon atoms, and combinations thereof.

31. The process of claim 30, wherein the olefin feed further contains one or more comonomers selected from linear or branched $C_4$ to $C_{20}$ alpha olefins.

32. The process of claim 31, wherein the olefin feed further contains one or more comonomers selected from linear $C_4$ to $C_8$ alpha olefins.

33. The process of claim 1, wherein the olefin feed further contains one or more comonomers that include at least one polyene.

34. The process of claim 1, wherein the olefin feed further contains one or more comonomers selected from the group consisting of hydrocarbons, polar moieties, and mixtures thereof.

35. The process of claim 1, wherein the bulky ligand metallocene-type catalyst is supported.

36. The process of claim 1, wherein the bulky ligand metallocene-type catalyst is unsupported.

37. The process of claim 1, wherein the process is carried out in a loop reactor.

38. The process of claim 1, wherein the process is carried out in a stirred tank reactor.

39. The process of claim 1, wherein the polymerization is carried out at a temperature of less than 100° C.

40. The process of claim 1, wherein the polymerization is carried out at a temperature of greater than 30° C.

41. The process of claim 39, wherein the polymerization is carried out at a temperature of less than 80° C.

42. The process of claim 40, wherein the polymerization is carried out at a temperature of less than 60° C.

43. The process of claim 1, wherein the propylene is prepolymerized prior to polymerizing with one or more comonomers.

44. The process of claim 1, wherein the propylene is prepolymerized with comonomer.

45. The process of claim 1, wherein the polymerization is carried out at a pressure of from 5 bar to 50 bar.

46. A process for producing polymer, comprising:
mixing together a diluent containing at least one fluorinated hydrocarbon, a bulky ligand metallocene-type catalyst system, and an olefin feed containing propylene and ethylene at not greater than 10 weight % ethylene, based on total weight of the olefin feed; and
forming a polymer wherein the at least one fluorinated hydrocarbon in the diluent is not a perfluorinated hydrocarbon, wherein the bulky ligand metallocene-type catalyst system comprises an activator and a bulky ligand metallocene-type compound is represented by the formula:

$L^A L^B M Q_n$ (I) or $L^A A L^B M Q_n$ (II)

where M is a metal from Group 3 to 12 of the Periodic Table of Elements, $L^A$ and $L^B$ are selected from the group consisting of cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, pyrrolyl ligands, pyrozolyl ligands, carbazolyl ligands, borabenzene ligands and hydrogenated versions thereof;
Q is a monoanionic labile ligand having a sigma-bond to M, and depending on the oxidation state of M, the value for n is 0, 1 or 2 such that Formula I or II above represents a neutral bulky ligand metallocene-type catalyst compound; and
A is a bridging group containing carbon, germanium or silicon.

47. The process of claim 45, wherein the olefin feed contains less than 8 weight % ethylene, based on total weight of the olefin feed.

48. The process of claim 46, wherein the olefin feed contains less than 6 weight % ethylene, based on total weight of the olefin feed.

49. The process of claim 46, wherein the olefin feed contains less than 2 weight % ethylene, based on total weight of the olefin feed.

50. The process of claim 46, wherein the propylene is prepolymerized prior to polymerizing with the ethylene.

51. The process of claim 46, wherein the propylene and ethylene are prepolymerized.

52. A process for producing polypropylene copolymer, comprising:
mixing together a diluent containing at least one fluorinated hydrocarbon, a bulky ligand metallocene-type catalyst system, and an olefin feed containing at least 25 weight % propylene and greater than 10 weight % ethylene, based on total weight of the feed, and forming a polypropylene copolymer wherein the at least one fluorinated hydrocarbon in the diluent is not a perfluorinated hydrocarbon, wherein the bulky ligand metallocene-type catalyst system comprises an activator and a bulky ligand metallocene-type compound is represented by the formula:

$L^A L^B M Q_n$ (I) or $L^A A L^B M Q_n$ (II)

where M is a metal from Group 3 to 12 of the Periodic Table of Elements, $L^A$ and $L^B$ are selected from the group consisting of cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, pyrrolyl ligands, pyrozolyl ligands, carbazolyl ligands, borabenzene ligands and hydrogenated versions thereof;
Q is a monoanionic labile ligand having a sigma-bond to M, and depending on the oxidation state of M, the value for n is 0, 1 or 2 such that Formula I or II above represents a neutral bulky ligand metallocene-type catalyst compound; and
A is a bridging group containing carbon, germanium or silicon.

53. The process of claim 52, wherein the olefin feed contains at last 30 weight % propylene, based on total weight of the olefin feed.

54. The process of claim 52, wherein the olefin feed contains from 25 weight % to less than 90 weight % propylene, based on total weight of the olefin feed.

55. The process of claim 52, wherein the olefin feed contains less than 75 weight % ethylene, based on total weight of the olefin feed.

56. The process of claim 52, wherein the olefin feed contains less than 15 weight % ethylene, based on total weight of the olefin feed.

57. The process of claim 46, wherein the fluorinated hydrocarbon is present in the diluent at greater than 5 weight %, based on the total weight of the diluent.

58. The process of claim 1 wherein $L^A$ and $L^B$ are selected from the group consisting of cyclopentadienyl ligands, indenyl ligands and fluorenyl ligands.

59. The process of claim 1 wherein $L^A$ and $L^B$ are indenyl ligands.

60. The process of claim 59 wherein $L^A$ and $L^B$ are substituted with a combination of substituent groups R, said R groups being selected from hydrogen, linear alkyl radicals, branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl-carbamoyl radicals, dialkyl-carbamoyl radicals, acyloxy radicals, acylamino radicals, aroylamino radicals, straight alkylene radicals, branched alkylene radicals, cyclic alkylene radicals, and combinations thereof.

61. The process of claim 59 wherein $L^A$ and $L^B$ are substituted with a combination of substituent groups R, said R groups being selected from hydrogen, halogen, methyl, ethyl, propyl, butyl, pentyl, hexyl, cyclopentyl, cyclohexyl, benzyl, phenyl, and their isomers.

62. The process of claim 1 wherein the fluorinated hydrocarbon comprises 1,1,1,3,3,3-hexafluoropropane, 1,1,1,2-tetrafluoroethane, 1,1,1,3,3-pentafluoropropane, 1,1,1,3,3-pentafluorobutane, octafluorocyclobutane, and 2,3-dihydrodecafluoropentane.

63. The process of claim 1 wherein the polymerization process is a slurry process.

* * * * *